(12) United States Patent
Parekh et al.

(10) Patent No.: US 7,403,978 B2
(45) Date of Patent: *Jul. 22, 2008

(54) SYSTEMS AND METHODS FOR DETERMINING, COLLECTING, AND USING GEOGRAPHIC LOCATIONS OF INTERNET USERS

(75) Inventors: Sanjay M. Parekh, Duluth, GA (US); Robert B. Friedman, Decatur, GA (US); Neal K. Tibrewala, Pittsburgh, PA (US); Benjamin Lutch, Mountain View, CA (US)

(73) Assignee: Digital Envoy, Inc., Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/339,098

(22) Filed: Jan. 24, 2006

(65) Prior Publication Data

US 2006/0123105 A1    Jun. 8, 2006

Related U.S. Application Data

(63) Continuation of application No. 10/785,683, filed on Feb. 24, 2004, which is a continuation of application No. 09/541,451, filed on Mar. 31, 2000, now Pat. No. 6,757,740.

(60) Provisional application No. 60/133,939, filed on May 13, 1999, provisional application No. 60/132,147, filed on May 3, 1999.

(51) Int. Cl.
*G06F 15/16* (2006.01)
(52) U.S. Cl. .................. 709/217; 709/217; 709/245
(58) Field of Classification Search ......... 709/217–219, 709/238–245
See application file for complete search history.

(56) References Cited

U.S. PATENT DOCUMENTS 4,939,723 A    7/1990    Harley, Jr. et al. ............. 370/84

(Continued)

FOREIGN PATENT DOCUMENTS

WO    WO 96/13108    5/1996

(Continued)

OTHER PUBLICATIONS

Tomasz Imielinski and Julio C. Navas; "Geographic Addressing, Routing, and Resource Discovery with the Global Positioning System"; Computer Science Dept. Rutgers, The State University, Piscataway, NJ 08855, Oct. 19, 1996; pp. 1-10.

(Continued)

*Primary Examiner*—Yasin M Barqadle
(74) *Attorney, Agent, or Firm*—Needle & Rosenberg, P.C.

(57) ABSTRACT

A method of determining a geographic location of an Internet user involves determining if the host is on-line, determining ownership of the host name, and then determining the route taken in delivering packets to the user. Based on the detected route, the method proceeds with determining the geographic route based on the host locations and then assigning a confidence level to the assigned location. A system collects the geographic information and allows web sites or other entities to request the geographic location of their visitors. The database of geographic locations may be stored in a central location or, alternatively, may be at least partially located at the web site. With this information, web sites can target content, advertising, or route traffic depending upon the geographic locations of their visitors. Through web site requests for geographic information, a central database tracks an Internet user's traffic on the Internet whereby a profile can be generated. In addition to this profile, the central database can store visitor's preferences as to what content should be delivered to an IP address, the available interface, and the network speed associated with that IP address.

3 Claims, 15 Drawing Sheets

U.S. PATENT DOCUMENTS

| | | | |
|---|---|---|---|
| 4,939,726 A | 7/1990 | Flammer et al. | |
| 5,042,027 A | 8/1991 | Takahashi et al. | |
| 5,042,032 A | 8/1991 | Dighe et al. | |
| 5,115,433 A | 5/1992 | Baran et al. | |
| 5,231,631 A | 7/1993 | Buhrke et al. | |
| 5,291,550 A | 3/1994 | Levy et al. | |
| 5,418,713 A | 5/1995 | Allen | |
| 5,421,024 A | 5/1995 | Faulk, Jr. et al. | |
| 5,459,863 A | 10/1995 | Taylor | 395/600 |
| 5,488,608 A | 1/1996 | Flammer, III | |
| 5,490,252 A | 2/1996 | Macera et al. | |
| 5,493,689 A | 2/1996 | Waclawsky et al. | |
| 5,636,276 A | 6/1997 | Brugger | |
| 5,659,596 A | 8/1997 | Dunn | |
| 5,680,390 A | 10/1997 | Robrock, II | |
| 5,734,651 A | 3/1998 | Blakeley et al. | |
| 5,734,823 A | 3/1998 | Saigh et al. | |
| 5,734,891 A | 3/1998 | Saigh | |
| 5,774,668 A | 6/1998 | Choquier et al. | |
| 5,777,989 A | 7/1998 | McGarvey | |
| 5,794,217 A | 8/1998 | Allen | |
| 5,857,191 A | 1/1999 | Blackwell, Jr. et al. | 707/10 |
| 5,862,339 A | 1/1999 | Bonnaure et al. | |
| 5,870,561 A | 2/1999 | Jarvis et al. | |
| 5,878,126 A | 3/1999 | Velamuri et al. | |
| 5,913,036 A | 6/1999 | DeMoss et al. | |
| 5,920,697 A | 7/1999 | Masters et al. | 395/200.49 |
| 5,930,474 A | 7/1999 | Dunworth et al. | |
| 5,937,163 A | 8/1999 | Lee et al. | |
| 5,944,790 A | 8/1999 | Levy | |
| 5,948,061 A | 9/1999 | Merriman et al. | |
| 5,948,081 A | 9/1999 | Merriman et al. | |
| 5,958,052 A | 9/1999 | Bellovin et al. | 713/201 |
| 5,963,915 A | 10/1999 | Kirsch | 705/26 |
| 5,974,457 A | 10/1999 | Waclawsky et al. | 709/224 |
| 5,978,845 A | 11/1999 | Reisacher | |
| 6,009,081 A | 12/1999 | Wheeler et al. | |
| 6,012,052 A | 1/2000 | Altschuler et al. | |
| 6,012,088 A | 1/2000 | Li et al. | |
| 6,012,090 A | 1/2000 | Chung et al. | |
| 6,014,634 A | 1/2000 | Scroggie et al. | |
| 6,035,332 A | 3/2000 | Ingrassia, Jr. et al. | |
| 6,069,895 A | 5/2000 | Ayandeh | 370/399 |
| 6,069,939 A | 5/2000 | Fung et al. | 379/67.1 |
| 6,091,959 A | 7/2000 | Souissi et al. | |
| 6,128,664 A | 10/2000 | Yanagidate et al. | 709/228 |
| 6,130,890 A | 10/2000 | Leinwand et al. | |
| 6,148,335 A | 11/2000 | Robinson et al. | |
| 6,151,631 A | 11/2000 | Ansell et al. | |
| 6,167,259 A | 12/2000 | Shah | |
| 6,185,598 B1 | 2/2001 | Farber | |
| 6,192,312 B1 | 2/2001 | Hummelsheim | |
| 6,243,746 B1 | 6/2001 | Sondur et al. | |
| 6,243,749 B1 | 6/2001 | Sitaraman et al. | |
| 6,249,252 B1 | 6/2001 | Dupray | |
| 6,259,701 B1 | 7/2001 | Shur et al. | |
| 6,266,607 B1 | 7/2001 | Meis et al. | |
| 6,272,150 B1 | 8/2001 | Hrastar et al. | |
| 6,272,343 B1 | 8/2001 | Pon et al. | |
| 6,275,470 B1 | 8/2001 | Ricciulli | |
| 6,285,660 B1 | 9/2001 | Ronen | 370/259 |
| 6,285,748 B1 | 9/2001 | Lewis | |
| 6,286,047 B1 | 9/2001 | Ramanathan et al. | |
| 6,324,585 B1 | 11/2001 | Zhang et al. | |
| 6,327,677 B1 | 12/2001 | Garg et al. | 714/37 |
| 6,330,239 B1 | 12/2001 | Suzuki | 370/395 |
| 6,332,158 B1 | 12/2001 | Risley et al. | 709/219 |
| 6,338,082 B1 | 1/2002 | Schneider | |
| 6,343,290 B1 | 1/2002 | Cossins | |
| 6,345,303 B1 | 2/2002 | Knauerhase et al. | 709/238 |
| 6,347,078 B1 | 2/2002 | Narvaez-Guarnieri et al. | |
| 6,356,761 B1 | 3/2002 | Huttunen et al. | 455/456 |
| 6,356,929 B1 | 3/2002 | Gall et al. | |
| 6,374,302 B1 | 4/2002 | Galasso et al. | 709/238 |
| 6,397,246 B1 | 5/2002 | Wolfe | 709/217 |
| 6,415,323 B1 | 7/2002 | McCanne et al. | |
| 6,421,726 B1 | 7/2002 | Kenner | |
| 6,425,000 B1 | 7/2002 | Carmello et al. | |
| 6,442,565 B1 | 8/2002 | Tyra et al. | |
| 6,466,940 B1 | 10/2002 | Mills et al. | |
| 6,477,150 B1 | 11/2002 | Maggenti et al. | |
| 6,484,143 B1 | 11/2002 | Swildens et al. | |
| 6,487,538 B1 | 11/2002 | Gupta et al. | |
| 6,505,201 B1 | 1/2003 | Haitsuka et al. | |
| 6,505,254 B1 | 1/2003 | Johnson et al. | 709/239 |
| 6,505,255 B1 | 1/2003 | Akatsu et al. | 709/239 |
| 6,513,061 B1 | 1/2003 | Ebata et al. | |
| 6,526,450 B1 | 2/2003 | Zhang et al. | |
| 6,529,475 B1 | 3/2003 | Wan et al. | 370/231 |
| 6,529,491 B1 | 3/2003 | Chang et al. | 370/335 |
| 6,542,739 B1 | 4/2003 | Garner | |
| 6,571,279 B1 | 5/2003 | Herz et al. | 709/217 |
| 6,574,663 B1 | 6/2003 | Bakshi et al. | 709/223 |
| 6,577,653 B1 | 6/2003 | Rochberger et al. | 370/536 |
| 6,578,066 B1 | 6/2003 | Logan et al. | |
| 6,629,136 B1 | 9/2003 | Naidoo | |
| 6,665,715 B1 | 12/2003 | Houri | |
| 6,684,250 B2 | 1/2004 | Anderson et al. | |
| 6,721,795 B1 | 4/2004 | Eldreth | 709/232 |
| 6,836,476 B1 | 12/2004 | Dunn et al. | 370/352 |
| 6,968,394 B1 | 11/2005 | El-Rafie | 709/245 |
| 6,973,039 B2 | 12/2005 | Redi et al. | 370/238 |
| 6,996,084 B2 | 2/2006 | Troxel et al. | 370/338 |
| 7,039,689 B2 | 5/2006 | Martija | |
| 7,062,572 B1 | 6/2006 | Hampton | |
| 7,072,963 B2 | 7/2006 | Anderson | |
| 2001/0020242 A1 | 9/2001 | Gupta et al. | 707/501.1 |
| 2002/0007374 A1 | 1/2002 | Marks et al. | |
| 2002/0131363 A1 | 9/2002 | Beshai | 370/230 |
| 2002/0143991 A1 | 10/2002 | Chow et al. | |
| 2003/0065571 A1 | 4/2003 | Dutta | 705/26 |
| 2003/0090996 A1 | 5/2003 | Stewart | 370/225 |
| 2004/0199623 A1 | 10/2004 | Houri | |
| 2006/0212601 A1 | 9/2006 | Hampton | |

FOREIGN PATENT DOCUMENTS

| | | |
|---|---|---|
| WO | WO 99/34305 | 7/1999 |
| WO | WO 00/22496 | 4/2000 |
| WO | WO 00/67450 | 11/2000 |
| WO | WO 01/57696 A1 | 8/2001 |
| WO | WO 01/75632 | 10/2001 |
| WO | WO 01/75698 A | 10/2001 |
| WO | WO 02/13459 | 2/2002 |
| WO | WO 02/17139 A1 | 2/2002 |
| WO | WO 02/23807 | 3/2002 |

OTHER PUBLICATIONS

Kessler & Shepard; "A Primer on Internet and TCP/IP Tools and Utilities"; Network Working Group; Request for Comments: 2151; FYI: 30; Obsoletes: RFC 1739; Category: Informational; Http://www.ietff.org/rfc/rfc2151.txt; Jun. 1997; (pp. 1-46).

"Subnet Masking Definition", www.exabyte.net/lambert/subnet/subnet_masking_definition.htm, John Lambert, 1999.

Mathew A. Debellus; "Digital Envoy Greets $-1.1 Million"; VC & Startups; http://www.redherring.com/vc/2000/0229/vc-digitalenvoy022900.html; Feb. 29, 2000; (3 pages).

Kevin S. Mccurley, "Geospecial Mapping and Navigation of the Web"; IBM Almaden Research Center; San Jose, CA 95120; May 1-5, 2001; pp. 221-229.

Orkut Buyukkokten, "Exploiting Geographical Location Information of Web Pages" Department of Computer Science, Stanford University, Stanford, CA 94305; pp. 1-6.

Narushige Shiode, "Analyzing the Geography of Internet Address Space" http://geog.ucl.uk/casa/martine/internetspace; pp. 1-3; (date unknown).

"Subnet Addressing", *Network Computing*, by Ron Cooney, www.networkcomputing.com/unixworld, tutorial/001.html, (no date given).

Rousseau, Jean/Marc; Roy, Serge: GeoRoute: An Interactive Graphics System for Routing and Scheduling Over Street Networks; Sep. 1989; pp. 161/163.

"Real Time Geographic Visualization of World Wide Web Traffic" Stephen E. Lamm, Daniel A. Reed, Will H. Scullin. WWW Journal, Issue 3.

"Nicname?Whois", Internet Engineering Task Force, Request for Comments 954.

"A Primer on Internet and TCT/IP Tools and Utilities," Internet Engineering Task Force, Request for Comments 2151.

"Domain Name System Security Extensions," Internet Engineering Task Force, Request for Comments 2535.

"Content Delivery Services: Footprint Streaming Solutions," Brochure from Digital Island.

"TraceWire White Paper," Brochure from Digital Island, Jun. 1999.

"We Know Where You Live," Scott Woolley, Forbes Magazine, Nov. 13, 2000.

U.S. Appl. No. 60/194,761, filed Apr. 3, 2000, Christopher Herringshaw et al, inventor.

U.S. Appl. No. 60/241,776, filed Oct. 18, 2000, Brad Doctor, et al, inventor.

International Search Report for PCT/US 03/08164 mailed Aug. 11, 2003.

International Search Report for PCT/US02/37725, date mailed Apr. 21, 2003.

International Search Report for PCT/US03/08164, date mailed Aug. 11, 2003.

Examination Report for EPO 03714211.4-2416 dated Oct. 1, 2004.

European Search Report for EP 06 01 1091 dated Jul. 7, 2006.

Office Action for Appl. No. 2,372,808 dated Aug. 16, 2005.

Response to Office Action for Appl. No. 2,372,808 dated Feb. 16, 2006.

International Search Report for PCT/US00/11803 dated Jul. 9, 2000.

Invitation to Restrict or to Pay Additional Fees mailed Feb. 7, 2001.

Written Opinion for PCT/US00/11803 mailed Apr. 3, 2001.

Notification of Transmittal of International Preliminary Examination Report mailed Jul. 26, 2001.

Examiner's Report for Appl. No. 48129/00 dated Apr. 9, 2003.

Examiner's Report for Application No. 48129/00 dated Dec. 14, 2004.

Examiner's Report for Appl. No. 2003218218 dated Apr. 24, 2007.

Written Opinion for PCT/US01/24617 mailed Apr. 9, 2002.

Notification of Transmittal of International Preliminary Examination Report for PCT/US01/24617 mailed Sep. 3, 2002.

International Search Report for WO 02/13459 mailed Feb. 18, 2002.

Rousseau, Jean/Marc, Roy, Serge: GeoRoute: An Interactive Graphics System for Routing and Scheduling Over Street Networks; Sep. 1989; pp. 161-163.

Gargano et al. RFC: 1834, "Whois and Network Information Lookup Service," Aug. 1995, (7 Pages).

Office Action for U.S. Appl. No. 09/632,959, mailed Jan. 18, 2008.

Office Action for U.S. Appl. No. 10/106,523, mailed Feb. 6, 2008.

Office Action for U.S. Appl. No. 10/938,750, mailed Jan. 24, 2008.

Decision Granting Petition Under 37 CFR 1.313(c)(2) for U.S. Appl. No. 10/785,683, mailed Mar. 21, 2008.

Request for Continued Examination for U.S. 10/785,683, filed Mar. 20, 2008.

Petition Under 37 CRF 1.313(c)(2) for U.S. Appl. No. 10/785,683, filed Mar. 20, 2008.

Issue Notification for U.S. Appl. No. 10/785,683, mailed Mar. 5, 2008.

Office Action for U.S. Appl. No. 09/702,094, mailed Apr. 4, 2008.

Office Action for U.S. Appl. No. 11/070,839, mailed Mar. 26, 2008.

Article 96(2) Communication for EP App. No. 00 930 277, dated Oct. 15, 2007.

European Search Report for EP App. No. 06 011 091, dated Aug. 7, 2006.

Invitation pursuant to Article 96(2) for EP. App. No. 06 011 091, dated Nov. 7, 2007.

Reply to Examination Report for EP. App. No. 06 011 091, dated Oct. 15, 2007.

SYSTEMS AND METHODS FOR DETERMINING, COLLECTING, AND USING GEOGRAPHIC LOCATIONS OF INTERNET USERS

CROSS-REFERENCE TO RELATED APPLICATIONS

This application is a continuation of U.S. application Ser. No. 10/785,683 filed on Feb. 24, 2004, which is a continuation of U.S. application Ser. No. 09/541,451 filed on Mar. 31, 2000, now U.S. Pat. No. 6,757,740, which claims the benefit of U.S. Provisional Application No. 60/133,939 filed on May 13, 1999, and U.S. Provisional Application No. 60/132,147 filed on May 3, 1999, and incorporates herein all of the applications by reference in their entireties.

FIELD OF THE INVENTION

The present invention relates to systems and methods for determining geographic locations of Internet users. According to other aspects, the invention relates to systems and methods for collecting geographic locations of Internet users, for profiling Internet users, or for selectively delivering information based on the geographic locations or connection speeds of the Internet users.

BACKGROUND

The Internet consists of a network of interconnected computer networks. Each of these computers has an IP address that is comprised of a series of four numbers separated by periods or dots and each of these four numbers is an 8-bit integer which collectively represent the unique address of the computer within the Internet. The Internet is a packet switching network whereby a data file routed over the Internet to some destination is broken down into a number of packets that are separately transmitted to the destination. Each packet contains, inter alia, some portion of the data file and the IP address of the destination.

The IP address of a destination is useful in routing packets to the correct destination but is not very people friendly. A group of four 8-bit numbers by themselves do not reveal or suggest anything about the destination and most people would find it difficult to remember the IP addresses of a destination. As a result of this shortcoming in just using IP addresses, domain names were created. Domain names consist of two or more parts, frequently words, separated by periods. Since the words, numbers, or other symbols forming a domain name often indicate or at least suggest the identity of a destination, domain names have become the standard way of entering an address and are more easily remembered than the IP addresses. After a domain name has been entered, a domain name server (DNS) resolves the domain name into a specific IP address. Thus, for example, when someone surfing the Internet enters into a browser program a particular domain name for a web site, the browser first queries the DNS to arrive at the proper IP address.

While the IP address works well to deliver packets to the correct address on the Internet, IP addresses do not convey any useful information about the geographic address of the destination. Furthermore, the domain names do not even necessarily indicate any geographic location although sometimes they may suggest, correctly or incorrectly, such a location. This absence of a link between the IP address or domain name and the geographic location holds true both nationally and internationally. For instance, a country top-level domain format designates .us for the United States, .uk for the United Kingdom, etc. Thus, by referencing these extensions, at least the country within which the computer is located can often be determined. These extensions, however, can often be deceiving and may be inaccurate. For instance, the .md domain is assigned to the Republic of Moldova but has become quite popular with medical doctors in the United States. Consequently, while the domain name may suggest some aspect of the computer's geographic location, the domain name and the IP address often do not convey any useful geographic information.

In addition to the geographic location, the IP address and domain name also tell very little information about the person or company using the computer or computer network. Consequently, it is therefore possible for visitors to go to a web site, transfer files, or send email without revealing their true identity. This anonymity, however, runs counter to the desires of many web sites. For example, for advertising purposes, it is desirable to target each advertisement to a select market group optimized for the goods or services associated with the advertisement. An advertisement for a product or service that matches or is closely associated with the interests of a person or group will be much more effective, and thus more valuable to the advertisers, than an advertisement that is blindly sent out to every visitor to the site.

Driven often by the desire to increase advertising revenues and to increase sales, many sites are now profiling their visitors. To profile a visitor, web sites first monitor their visitors' traffic historically through the site and detect patterns of behavior for different groups of visitors. The web site may come to infer that a certain group of visitors requesting a page or sequence of pages has a particular interest. When selecting an advertisement for the next page requested by an individual in that group, the web site can target an advertisement associated with the inferred interest of the individual or group. Thus, the visitor's traffic through the web site is mapped and analyzed based on the behavior of other visitors at the web site. Many web sites are therefore interested in learning as much as possible about their visitors in order to increase the profitability of their web site.

The desire to learn more about users of the Internet is countered by privacy concerns of the users. The use of cookies, for instance, is objectionable to many visitors. In fact, bills have been introduced into the House of Representatives and also in the Senate controlling the use of cookies or digital ID tags. By placing cookies on a user's computer, companies can track visitors across numerous web sites, thereby suggesting interests of the visitors. While many companies may find cookies and other profiling techniques beneficial, profiling techniques have not won wide-spread approval from the public at large.

A particularly telling example of the competing interests between privacy and profiling is when Double Click, Inc. of New York, N.Y. tied the names and addresses of individuals to their respective IP addresses. The reactions to Double Click's actions included the filing of a complaint with the Federal Trade Commission (FTC) by the Electronic Privacy Information Center and outbursts from many privacy advocates that the tracking of browsing habits of visitors is inherently invasive. Thus, even though the technology may allow for precise tracking of individuals on the Internet, companies must carefully balance the desire to profile visitors with the rights of the visitors in remaining anonymous.

A need therefore exists for systems and methods by which more detailed information may be obtained on visitors without jeopardizing or compromising the visitors' privacy rights.

SUMMARY

The invention addresses the problems above by providing systems and methods for determining the geographic locations of Internet users. According to one aspect, a method of collecting geographic information involves taking one of the IP address or host name and determining the organization that owns the IP address. Preferably, the method first takes one of the IP address or host name and checks whether the host name is associated with that IP address, such as through an nslookup query. Next, the route to the host is acquired, preferably through a traceroute query, so as to determine a number of intermediate hosts. The specific route is analyzed and mapped against a database of stored geographic locations, thereby mapping out the intermediate hosts. For any intermediate host not having a location stored in the database, the method involves determining a geographic location and storing this information in the database.

According to another aspect, the invention relates to a system for determining geographic locations of Internet users. The determination system receives queries from requesters, such as web sites, for the geographic location of a certain Internet user. The determination system in turn queries a central database of stored locations and returns the geographic information if contained in the database. If the geographic information is not in the database, then the system performs a search to collect that information. Instead of querying a central database each time geographic location of an Internet user is desired, the web site or other requestor may have geographic locations of at least some Internet users stored in a local database. The web site first checks with the local database for the geographic information and, if it not available, then sends a query to the central database.

The geographic location information of Internet users can be used for a variety of purposes. For instance, a position targeter can be associated with web sites to target the delivery of information based on the geographic location information. The web sites can selectively deliver content or advertising based on the geographic location of its visitors. The geographic location information can also be used in the routing of Internet traffic. A traffic manager associated with a number of web servers detects the geographic locations of its Internet visitors and routes the traffic to the closest server.

The databases of geographic locations can contain other information that may be useful to web sites and other requestors. The databases, for instance, can serve as a registry for allowed content that may be delivered to a particular IP address or range of IP addresses. Thus, prior to a web site delivering content to an IP address, the web site may query the database to ensure that the delivery of the content is permitted. The databases may store network speeds of Internet users whereby a web site can tailor the amount of content delivered to an Internet user based in part of the bandwidth to that user. The databases may also store an interface of an Internet user whereby a web site can tailor the content and presentation for that particular interface. Other uses of the geographic location and of the systems and methods described herein will be apparent to those skilled in the art and are encompassed by the invention.

BRIEF DESCRIPTION OF DRAWINGS

The accompanying drawings, which are incorporated in and form a part of the specification, illustrate preferred embodiments of the present invention and, together with the description, disclose the principles of the invention. In the drawings.

DETAILED DESCRIPTION

Reference will now be made in detail to preferred embodiments of the invention, non-limiting examples of which are illustrated in the accompanying drawings.

I. Collecting, Determining and Distributing Geographic Locations

According to one aspect, the present invention relates to systems and methods of collecting, determining, and distributing data that identifies where an Internet user is likely to be geographically located. Because the method of addressing on the Internet, Internet Protocol (IP) addresses, allows for any range of addresses to be located anywhere in the world, determining the actual location of any given machine, or host, is not a simple task.

A. Collecting Geographic Location Data

Figure 1:
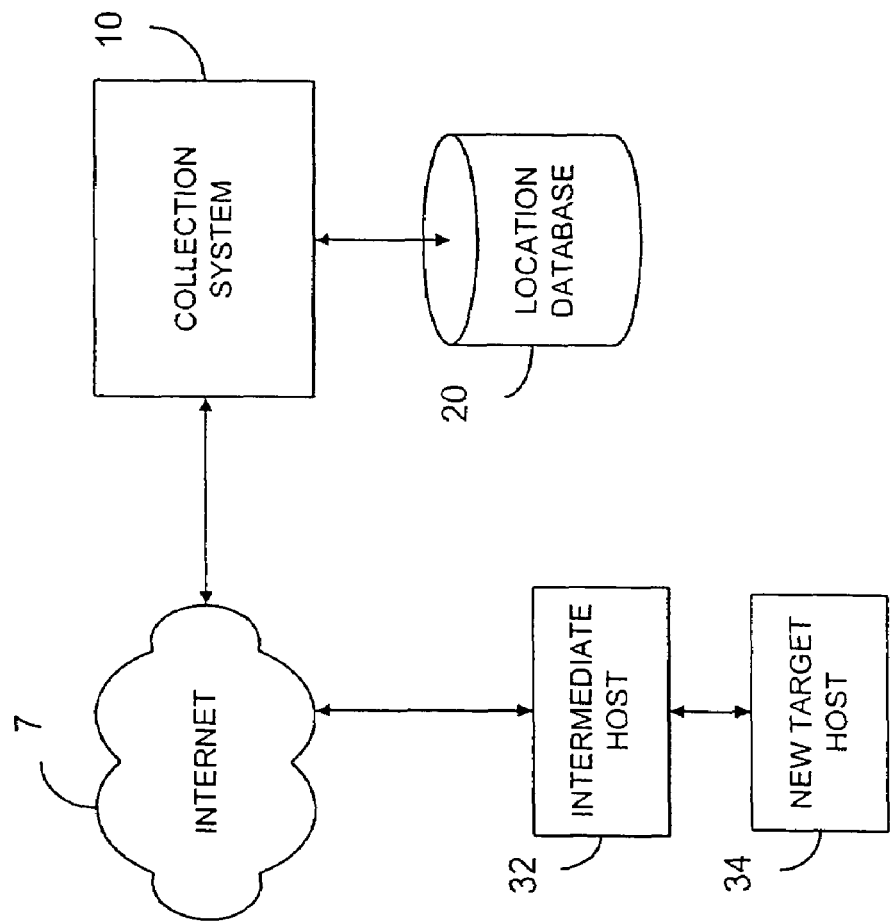
FIG. 1 is a block diagram of a network having a collection system according to a preferred embodiment of the invention.

A system 10 for collecting geographic information is shown in FIG. 1. The system 10 uses various Internet route tools to aid in discovering the likely placement of newly discovered Internet hosts, such as new target host 34. In particular the system 10 preferably uses programs known as host, nslookup, ping, traceroute, and whois in determining a geographic location for the target host 34. It should be understood that the invention is not limited to these programs but may use other programs or systems that offer the same or similar functionality. Thus, the invention may use any systems or methods to determine the geographic location or provide further information that will help ascertain the geographic location of an IP address.

In particular, nslookup, ping, traceroute, and whois provide the best source of information. The operation of ping and traceroute is explained in the Internet Engineering Task Force (IETF) Request For Comments (RFC) numbered 2151 which may be found at http://www.ietf.org/rfc/rfc2151.txt, nslookup (actually DNS lookups) is explained in the IETF RFC numbered 2535 which may be found at http://www.ietf.org/rfc/rfcm2535.txt, and whois is explained in the IETF RFC numbered 954 which may be found at http://www.ietf.org/rfc/rfc0954.txt. A brief explanation of each of host, nslookup, ping, traceroute, and whois is given below. In explaining the operation of these commands, source host refers to the machine that the system 10 is run on and target host refers to the machine being searched for by the system 10, such as target host 34. A more detailed explanation of these commands is available via the RFCs specified or manual pages on a UNIX system.

host queries a target domain's DNS servers and collects information about the domain name. For example, with the "-l" option the command "host-l digitalenvoy.net" will show the system 10 all host names that have the suffix of digitalenvoy.net.

nslookup will convert an IP address to a host name or vice versa using the DNS lookup system.

ping sends a target host a request to see if the host is on-line and operational. ping can also be used to record the route that was taken to query the status of the target host but this is often not completely reliable.

traceroute is designed to determine the exact route that is taken to reach a target host. It is possible to use traceroute to determine a partial route to a non-existent or non-online target host machine. In this case the route will be traced to a certain point after which it will fail to record further progress towards the target host. The report that is provided to the system 10 by traceroute gives the IP address of each host encountered from the source host to the target host. traceroute can also provide host names for each host encountered using DNS if it is configured in this fashion.

whois queries servers on the Internet and can obtain registration information for a domain name or block of IP addresses.

Figure 2:
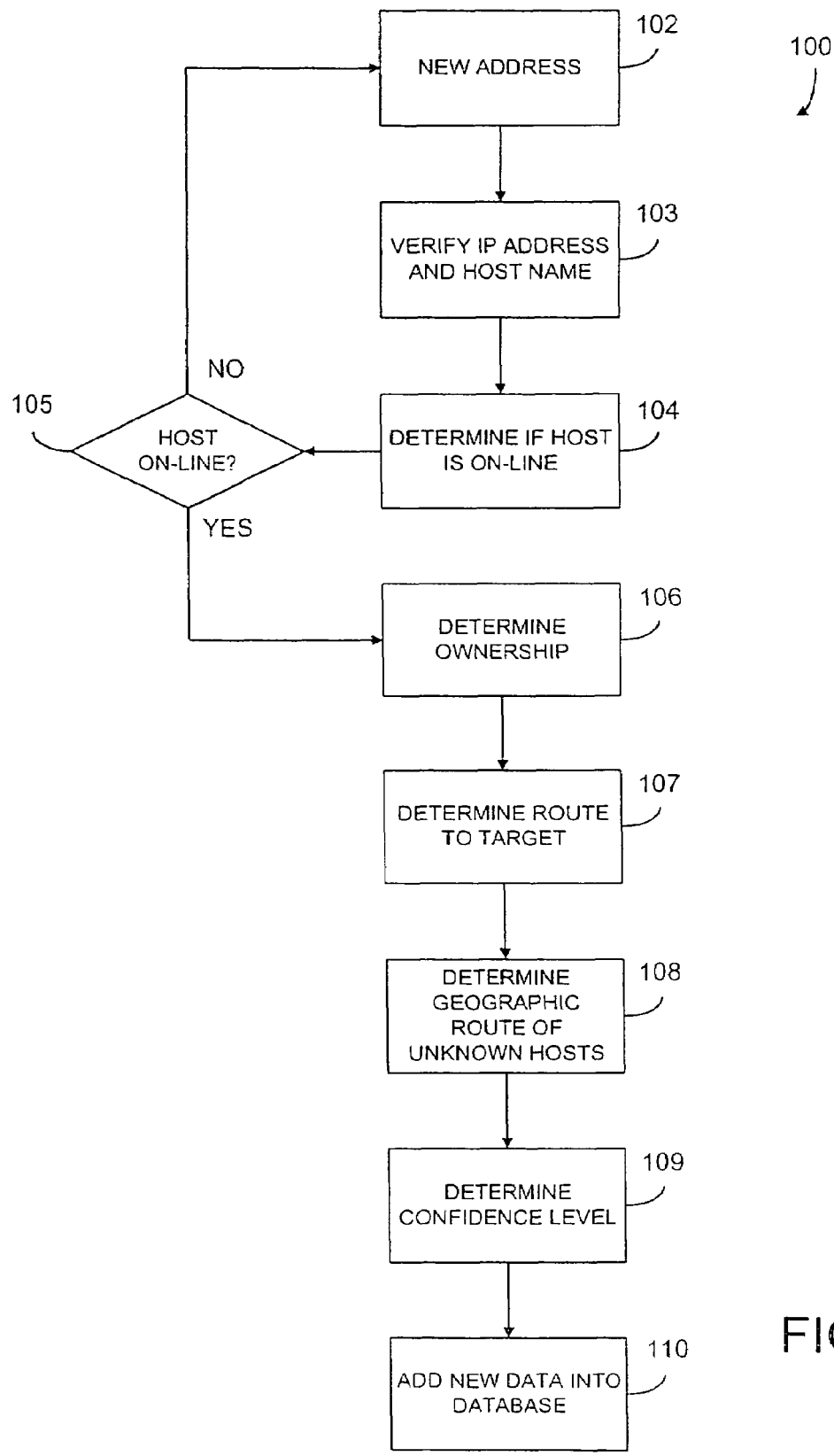
FIG. 2 is a flow chart depicting a preferred method of operation for the collection system of FIG. 1.

A preferred method 100 of operation for the system 10 will now be described with reference to FIGS. 1 and 2. At 102, the system 10 receives a new address for which a geographic location is desired. The system 10 accepts new target hosts that are currently not contained in its database 20 or that need to be re-verified. The system 10 requires only one of the IP address or the host name, although both can be provided. At 103, the system 10 preferably, although not necessarily, verifies the IP address and host name. The system 10 uses nslookup to obtain the host name or IP address to verify that both pieces of information are correct. Next, at 104, the system 10 determines if the target host 34 is on-line and operational and preferably accomplishes this function through a ping. If the host 34 is not on-line, the system 10 can re-queue the IP address for later analysis, depending upon the preferences in the configuration of the system 10.

At 106, the system 10 determines ownership of the domain name. Preferably, the system 10 uses a whois to determine the organization that actually owns the IP address. The address of this organization is not necessarily the location of the IP address but this information may be useful for smaller organizations whose IP blocks are often geographically in one location. At 107, the system 10 then determines the route taken to reach the target host 34. Preferably, the system 10 uses a traceroute on the target host 34. At 108, the system 10 takes the route to the target host 34 and analyzes and maps it geographically against a database 20 of stored locations. If any hosts leading to the target host, such as intermediate host 32, are not contained in the database 20, the system 10 makes a determination as to the location of those hosts.

At 109, a determination is then made as to the location of the target host and a confidence level, from 0 to 100, is assigned to the determination based on the confidence level of hosts leading to and new hosts found and the target host 34. All new hosts and their respective geographic locations are then added to the database 20 at 110.

If the host name is of the country top-level domain format (.us, .uk, etc.) then the system 10 first maps against the country and possibly the state, or province, and city of origin. The system 10, however, must still map the Internet route for the IP address in case the address does not originate from where the domain shows that it appears to originate. As discussed in the example above, the .md domain is assigned to the Republic of Moldova but is quite popular with medical doctors in the United States. Thus, the system 10 cannot rely completely upon the country top-level domain formats in determining the geographic location.

The method 100 allows the system 10 to determine the country, state, and city that the target host 34 originates from and allow for an assignment of a confidence level against entries in the database. The confidence level is assigned in the following manner. In cases where a dialer has been used to determine the IP address space assigned by an Internet Service Provider to a dial-up modem pool, which will be described in more detail below, the confidence entered is 100. Other confidences are based upon the neighboring entries. If two same location entries surround an unknown entry, the unknown entry is given a confidence of the average of the known same location entries. For instance, a location determined solely by whois might receive a 35 confidence level.

As an example, a sample search against the host "digitalenvoy.net" will now be described. First, the system 10 receives the target host "digitalenvoy.net" at 102 and does a DNS lookup on the name at 103. The command nslookup returns the following to the system 10:

>nslookup digitalenvoy.net

Name: digitalenvoy.net

Address: 209.153.199.15

The system 10 at 104 then does a ping on the machine, which tells the system 10 if the target host 34 is on-line and operational. The "-c 1" option tells ping to only send one packet. This option speeds up confirmation considerably. The ping returns the following to the system 10:

>ping -c 1 digitalenvoy.net

PING digitalenvoy.net (209.153.199.15): 56 data bytes 64 bytes from 209.153.199.15: icmp_seq=0 ttl=241 time=120.4 ms

- - - digitalenvoy.net ping statistics - - -

1 packets transmitted, 1 packets received, 0% packet loss round-trip min/avg/max=120.4/120.4/120.4 ms The system 10 next executes a whois at 106 on "digitalenvoy.net". In this example, the whois informs the system 10 that the registrant is in Georgia.

>whois digitalenvoy.net

Registrant:

Some One (DIGITALENVOY-DOM) 1234 Address Street ATLANTA, Ga. 33333 US

Domain Name: DIGITALENVOY.NET

Administrative Contact:

One, Some (SO0000) some(one.net +1 404 555 5555

Technical Contact, Zone Contact: myDNS Support (MS311-ORG) support@MYDNS.COM +1 (206) 374.2143

Billing Contact: One, Some (SO0000) some@one.net +1 404 555 5555

Record last updated on 14-Apr-99.

Record created on 14-Apr-99.

Database last updated on 22-Apr-99 11:06:22 EDT.

Domain servers in listed order:

| | |
|---|---|
| NS1.MYDOMAIN.COM | 209.153.199.2 |
| NS2.MYDOMAIN.COM | 209.153.199.3 |
| NS3.MYDOMAIN.COM | 209.153.199.4 |
| NS4.MYDOMAIN.COM | 209.153.199.5 |

The system 10 at 107 executes a traceroute on the target host 34. The traceroute on "digitalenvoy.net" returns the following to the system 10:

> traceroute digitalenvoy.net
traceroute to digitalenvoy.net (209.153.199.15), 30 hops max, 40 byte packets
 1 130.207.47.1 (130.207.47.1) 6.269 ms 2.287 ms 4.027 ms
 2 gateway1-rtr.gatech.edu (130.207.244.1) 1.703 ms 1.672 ms 1.928 ms
 3 fl-0.atlanta2-cr99.bbnplanet.net (192.221.26.2) 3.296 ms 3.051 ms 2.910 ms
 4 fl-0.atlanta2-br2.bbnplanet.net (4.0.2.90) 3.000 ms 3.617 ms 3.632 ms
 5 s4-0-0.atlanta1-br2.bbnplanet.net (4.0.1.149) 4.076 ms s8-1-0.atlanta1-br2.bbnplanet.net (4.0.2.157) 4.761 ms 4.740 ms
 6 h5-1-0.paloalto-br2.bbnplanet.net (4.0.3.142) 72.385 ms 71.635 ms 69.482 ms
 7 p2-0.paloalto-nbr2.bbnplanet.net (4.0.2.197) 82.580 ms 83.476 ms 82.987 ms
 8 p4-0.sanjose1-nbr1.bbnplanet.net (4.0.1.2) 79.299 ms 78.139 ms 80.416 ms
 9 p1-0-0.sanjose1-br2.bbnplanet.net (4.0.1.82) 78.918 ms 78.406 ms 79.217 ms
10 NSanjose-core0.nap.net (207.112.242.253) 80.031 ms 78.506 ms 122.622 ms
11 NSeattle1-core0.nap.net (207.112.247.138) 115.104 ms 112.868 ms 114.678 ms
12 sea-atm0.starcom-accesspoint.net (207.112.243.254) 112.639 ms 327.223 ms 173.847 ms
13 van-atm10.10.starcom.net (209.153.195.49) 118.899 ms 116.603 ms 114.036 ms
14 hume.worldway.net (209.153.199.15) 118.098 ms* 114.571 ms After referring to the geographic locations stored in the database 20, the system 10 analyzes these hops in the following way:

| | |
|---|---|
| 130.207.47.1 (130.207.47.1) | Host machine located in Atlanta, GA |
| gateway1-rtr.gatech.edu (130.207.244.1) | Atlanta, GA - confidence 100 |
| fl-0.atlanta2-cr99.bbnplanet.net (192.221.26.2) | Atlanta, GA - confidence 100 |
| fl-0.atlanta2-br2.bbnplanet.net (4.0.2.90) | Atlanta, GA - confidence 95 |
| s4-0-0.atlanta1-br2.bbnplanet.net (4.0.1.149) | Atlanta, GA - confidence 80 |
| h5-1-0.paloalto-br2.bbnplanet.net (4.0.3.142) | Palo Alto, CA - confidence 85 |
| p2-0.paloalto-nbr2.bbnplanet.net (4.0.2.197) | Palo Alto, CA - confidence 90 |
| p4-0.sanjose1-nbr1.bbnplanet.net (4.0.1.2) | San Jose, CA - confidence 85 |
| p1-0-0.sanjose1-br2.bbnplanet.net (4.0.1.82) | San Jose, CA - confidence 100 |
| NSanjose-core0.nap.net (207.112.242.253) | San Jose, CA - confidence 90 |
| NSeattle1-core0.nap.net (207.112.247.138) | Seattle, WA - confidence 95 |
| sea-atm0.starcom-accesspoint.net (207.112.243.254) | Seattle, WS - confidence 95 |
| van-atm10.10.starcom.net (209.153.195.49) | Vancouver, British Columbia Canada - confidence 100 |
| hume.worldway.net (209.153.199.15) | Vancouver, British Columbia Canada |

The system 10 assigns a confidence level of 99 indicating that the entry is contained in the database 20 and has been checked by a person for confirmation. While confirmations may be performed by persons, such as an analyst, according to other aspects of the invention the confirmation may be performed by an Artificial Intelligence system or any other suitable additional system, module, device, program, entities, etc. The system 10 reserves a confidence level of 100 for geographic information that has been confirmed by an Internet Service Providers (ISP). The ISP would provide the system 10 with the actual mapping of IP addresses against geography. Also, data gathered with the system 10 through dialing ISPs is given a 100 confidence level because of a definite connection between the geography and the IP address. Many of these hosts, such as intermediate host 32, will be repeatedly traversed when the system 10 searches for new target hosts, such as target host 34, and the confidence level of their geographic location should increase up to a maximum 99 unless confirmed by an ISP or verified by a system analyst. The confidence level can increase in a number of ways, such as by a set amount with each successive confirmation of the host's 32 geographic location.

The system 10 takes advantage in common naming conventions in leading to reasonable guesses as to the geographic location of the hosts. For example, any host that contains "sanjose" in the first part of its host name is probably located in San Jose, Calif. or connected to a system that is in San Jose, Calif. These comparison rule sets are implemented in the system 10 as entries in the database 20. The database 20 may have look-up tables listing geographic locations, such as city, county, regional, state, etc, with corresponding variations of the names. Thus, the database 20 could have multiple listings for the same city, such as SanFrancisco, SanFran, and Sfrancisco all for San Francisco, Calif.

Often a block of IP addresses are assigned and sub-assigned to organizations. For example, the IP block that contains the target address 209.153.199.15 can be queried:
>whois 209.153.199.15@whois.arin.net
[whois.arin.net]
Starcom International Optics Corp. (NETBLK-STARCOM97) STARCOM97 209.153.192.0-209.153.255.255
WORLDWAY HOLDINGS INC. (NETBLK-WWAY-NET-01) WWAY-NET-01 209.153.199.0-209.153.199.255

From the results of this query, the system 10 determines that the large block from 209.153.192.0 to 209.153.255.255 is assigned to Starcom International Optics Corp. Within this block, Starcom has assigned Worldway Holdings Inc. the 209.153.199.0 to 209.153.199.255 block. By further querying this block (NETBLK-WWAY-NET-01) the collection system 10 gains insight into where the organization exists. In this case the organization is in Vancouver, British Columbia, as shown below.
>whois NETBLK-WWAY-NET-01@whois.arin.net
[whois.arin.net]
WORLDWAY HOLDINGS INC. (NETBLK-WWAY-NET-01) 1336 West 15th Street North Vancouver, BC V7L 2S8 CA
Netname: WWAY-NET-01
Netblock: 209.153.199.0-209.153.199.255
Coordinator: WORLDWAY DNS (WD171-ORG-ARIN) dns@WORLDWAY.COM +1 (604) 608.2997
Domain System inverse mapping provided by:

| NS1.MYDNS.COM | 209.153.199.2 |
| NS2.MYDNS.COM | 209.153.199.3 |

With the combination of the trace and the IP block address information, the collection system 10 can be fairly certain that the host "digitalenvoy.net" is located in Vancouver, British Columbia. Because the collection system 10 "discovered" this host using automatic methods with no human intervention, the system 10 preferably assigns a confidence level slightly lower than the confidence level of the host that led to it. Also, the system 10 will not assume the geographic location will be the same for the organization and the sub-block of IP addresses assigned since the actual IP address may be in another physical location. The geographic locations may easily be different since IP blocks are assigned to a requesting organization and no indication is required for where the IP block will be used.

B. Obtaining Geographic Location Data from ISPs

Figure 3:
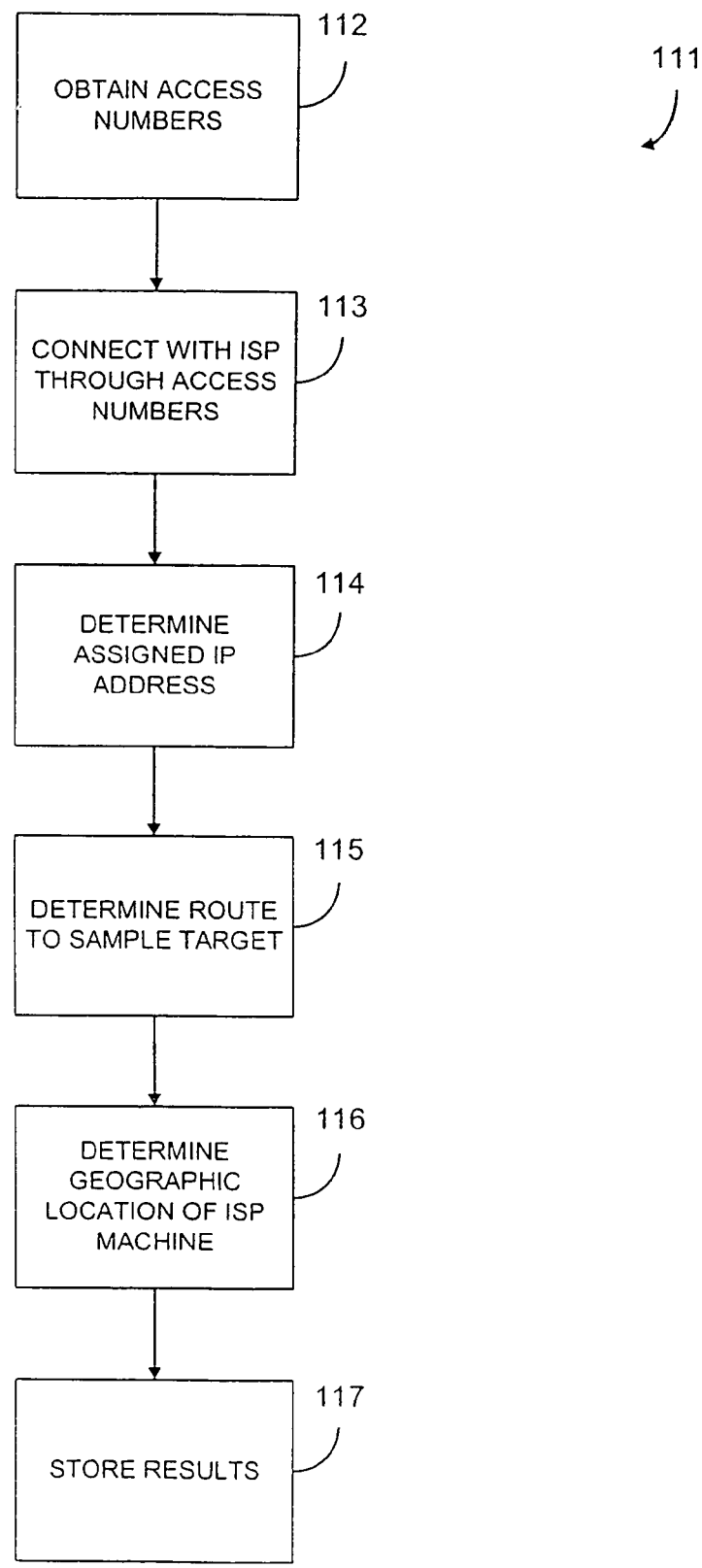
FIG. 3 is a flow chart depicting a preferred method of obtaining geographic information through an Internet Service Provider (ISP)

A method 111 for obtaining geographic locations from an ISP will now be described with reference to FIG. 3. At 112, the collection system 10 obtains access numbers for the ISP. The access numbers in the preferred embodiment are dial-up numbers and may be obtained in any suitable manner, such as by establishing an account with the ISP. Next, at 113, the collection system 10 connects with the ISP by using one of the access numbers. When the collection system 10 establishes communications with the ISP, the ISP assigns the collection system 10 an IP address, which is detected by the collection system 10 at 114.

The collection system 10 at 115 then determines the route to a sample target host and preferably determines this route through a traceroute. The exact target host that forms the basis of the traceroute as well as the final destination of the route is not important so any suitable host may be used. At 116, the collection system 10 analyzes the route obtained through traceroute to determine the location of the host associated with the ISP. Thus, the collection system 10 looks in a backward direction to determine the geographic location of the next hop in the traceroute. At 117, the collection system 10 stores the results of the analysis in the database 20.

With the method 111, the collection system 10 can therefore obtain the geographic locations of IP addresses with the assistance of the ISPs. Because the collection system 10 dials-up and connects with the ISP, the collection system 10 preferably performs the method 111 in a such a manner so as to alleviate the load placed on the ISP. For instance, the collection system 10 may perform the method 111 during off-peak times for the ISP, such as during the night. Also, the collection system 10 may control the frequency at which it connects with a particular ISP, such as establishing connections with the ISP at 10 minute intervals.

C. Determining Geographic Location Data

Figure 4:
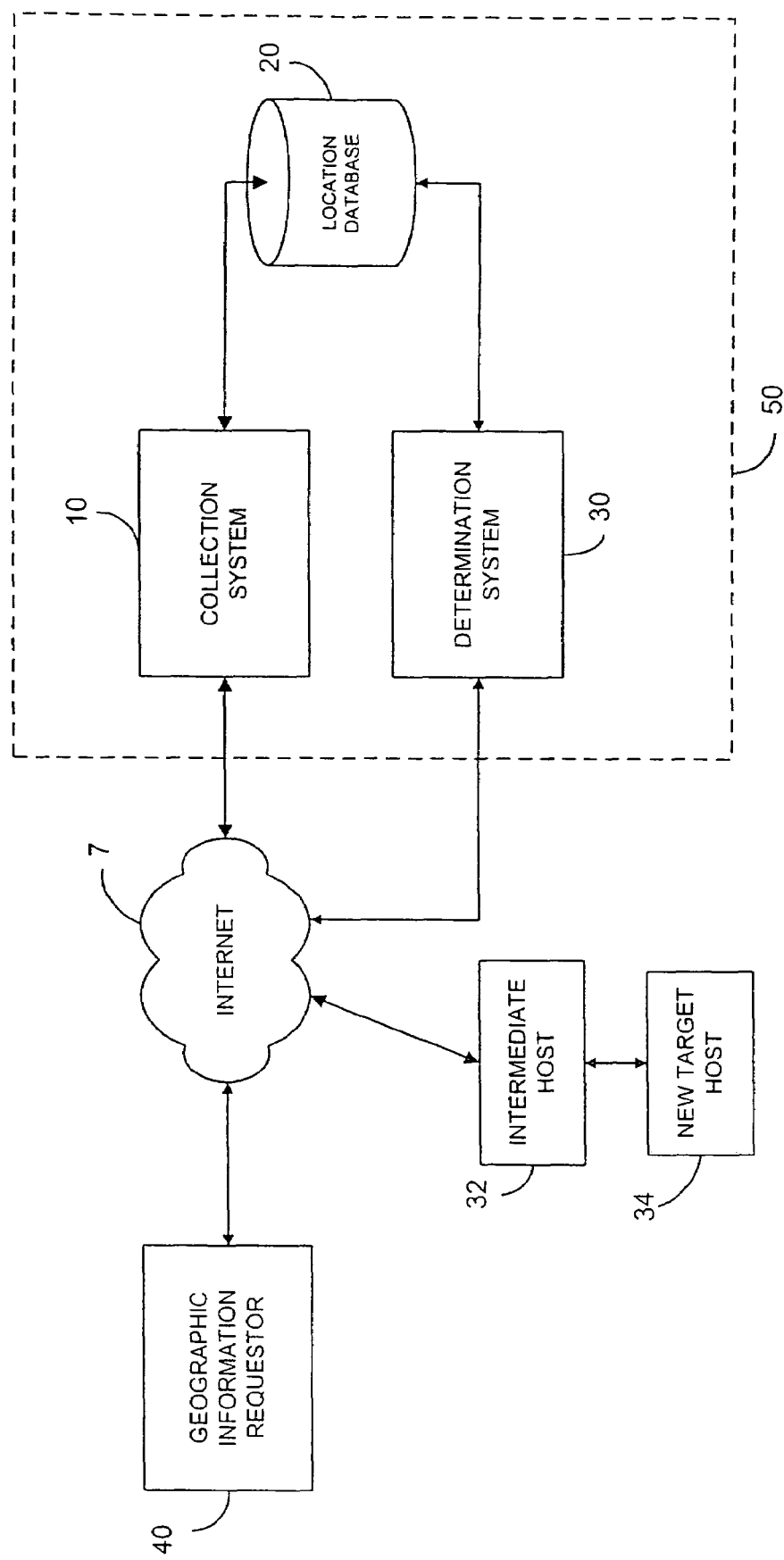
FIG. 4 is a block diagram of a network having a collection system and determination system according to a preferred embodiment of the invention.

With reference to FIG. 4, according to another aspect, the invention relates to a geographic determination system 30 that uses the database 20 created by the collection system 10. The determination system 10 receives requests for a geographic location and based on either the IP address or host name of the host being searched for, such as target host 34. A geographic information requestor 40 provides the request to, and the response from, the determination system 30 in an interactive network session that may occur through the Internet 7 or through some other network. The collection system 10, database 20, and determination system 30 can collectively be considered a collection and determination system 50.

Figure 5:
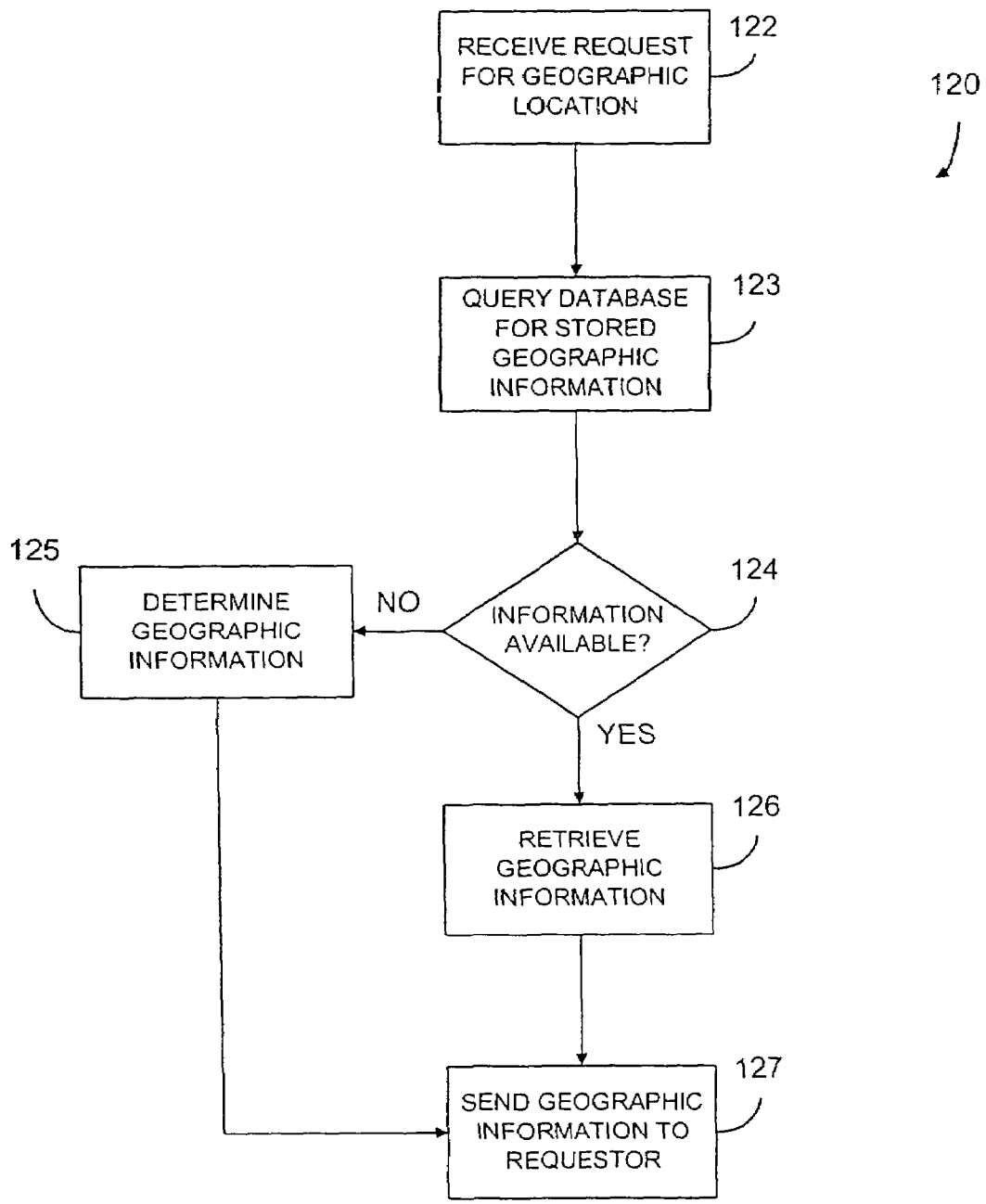
FIG. 5 is a flow chart depicting a preferred method of operation for the collection and determination system.

A preferred method 120 of operation for the determination system 30 will now be described with reference to FIG. 5. At 122, the system 30 receives a request for the geographic location of an entity and, as discussed above, receives one or both of the IP address and domain name. At 123, the determination system 30 searches the database 20 for the geographic location for the data provided, checking to see if the information has already been obtained. When searching for an IP address at 123, the system 30 also tries to find either the same exact IP address listed in the database 20 or a range or block of IP addresses listed in the database 20 that contains the IP address in question. If the IP address being searched for is within a block of addresses, the determination system 30 considers it a match, the information is retrieved at 125, and the geographic information is delivered to the requestor 40 at 126. If the information is not available in database 20, as determined at 124, then at 127 the system 30 informs the requestor 40 that the information is not known. At 128, the system 30 then determines the geographic location of the unknown IP address and stores the result in the database 20. As an alternative at 125 to stating that the geographic location is unknown, the system 30 could determine the geographic information and provide the information to the requestor 40.

The determination system 30 looks for both the IP address in the database 20 and also for the domain name. Since a single IP address may have multiple domain names, the determination system 30 looks for close matches to the domain name in question. For instance, when searching for a host name, the system 30 performs pattern matching against the entries in the database 20. When a match is found that suggests the same IP address, the determination system 30 returns the geographic data for that entry to the requestor 40.

An ambiguity may arise when the requestor 40 provides both an IP address and a domain name and these two pieces of data lead to different hosts and different geographic locations. If both data pieces do not exactly match geographically, then the system 30 preferably responds with the information that represents the best confidence. As another example, the system 30 may respond in a manner defined by the requestor 40. As some options, the determination system 30 can report only when the data coincide and agree with each other, may provide no information in the event of conflicting results, may provide the geographic information based only on the IP address, may provide the geographic information based only on the host name, or may instead provide a best guess based on the extent to which the address and host name match.

A sample format of a request sent by the requester 40 to the determination system 30 is provided below, wherein the search is against the host "digitalenvoy.net" and the items in bold are responses from the geographic determination system 30:
Connecting to server.digitalenvoy.net...
;digitalenvoy.net;
vancouver;british columbia;can;99;

The format of the request and the format of the output from the determination system 30 can of course be altered according to the application and are not in any way limited to the example provided above.

D. Distributing Geographic Location Data

A system for distributing the geographic location information will now be described with reference to FIGS. 6 and 7. According to a first aspect shown in FIG. 6, the geographic information on IP addresses and domain names is collected and determined by the system 50. A web site 60 may desire the geographic locations of its visitors and would desire this information from the collection and determination system 50. The web site 60 includes a web server 62 for receiving requests from users 5 for certain pages and a position targeter 64 for at least obtaining the geographic information of the users 5.

A preferred method 130 of operation of the network shown in FIG. 6 will now be described with reference to FIG. 7. At 132, the web server 62 receives a request from the user 5 for a web page. At 133, the web server 62 queries the position targeter 64 that, in turn, at 134 queries the collection and determination system 50 for the geographic location of the user. Preferably, the position targeter 64 sends the query through the Internet 7 to the collection and determination system 50. The position targeter 64, however, may send the query through other routes, such as through a direct connection to the collection and determination system 50 or through another network. As discussed above, the collection and determination system 50 accepts a target host's IP address, host name, or both and returns the geographic location of the host in a format specified by the web site 60. At 135, the position targeter obtains the geographic location from the collection and determination system 50, at 136 the information that will be delivered to the user 5 is selected, and is then delivered to the user 5 at 137. This information is preferably selected by the position targeter based on the geographic location of the user 5. Alternatively, the position targeter 64 may deliver the geographic information to the web server 62 which then selects the appropriate information to be delivered to the user 5. As discussed in more detail below, the geographic location may have a bearing on what content is delivered to the user, what advertising, the type of content, if any, delivered to the user 5, and/or the extent of content.

Figure 7:
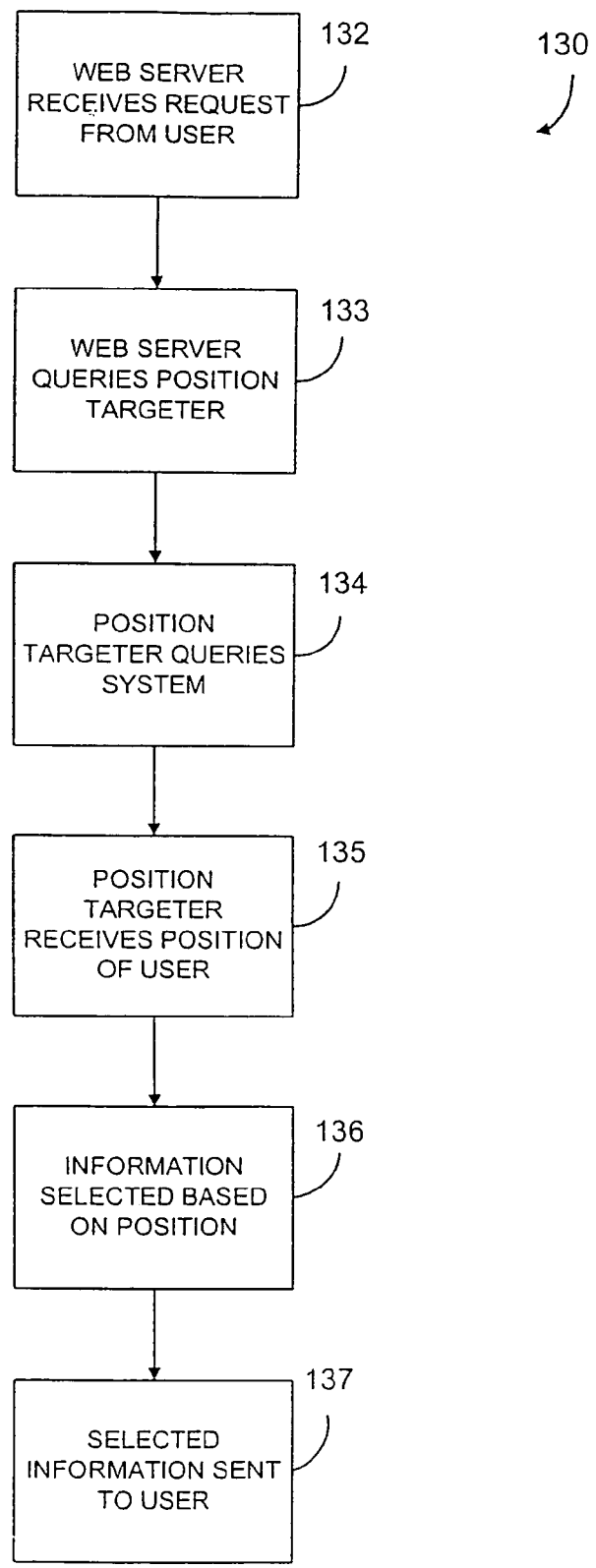
FIG. 7 is a flow chart depicting a preferred method of operation for the web server and position targeter of FIG. 6.
Figure 8:
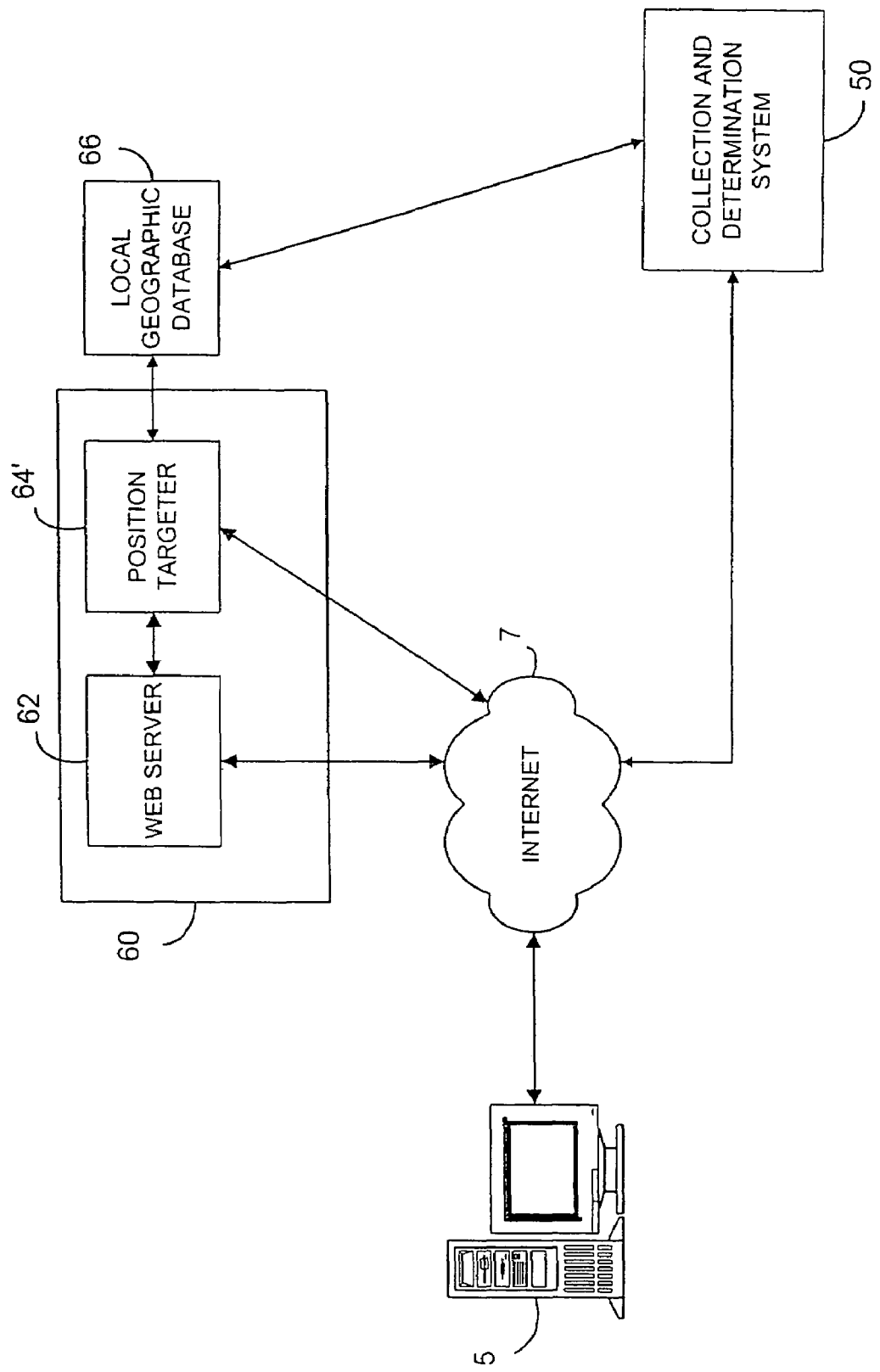
FIG. 8 is a block diagram of a web server using a position targeter having access to a local geographic database as well as the collection and determination system.
Figure 9:
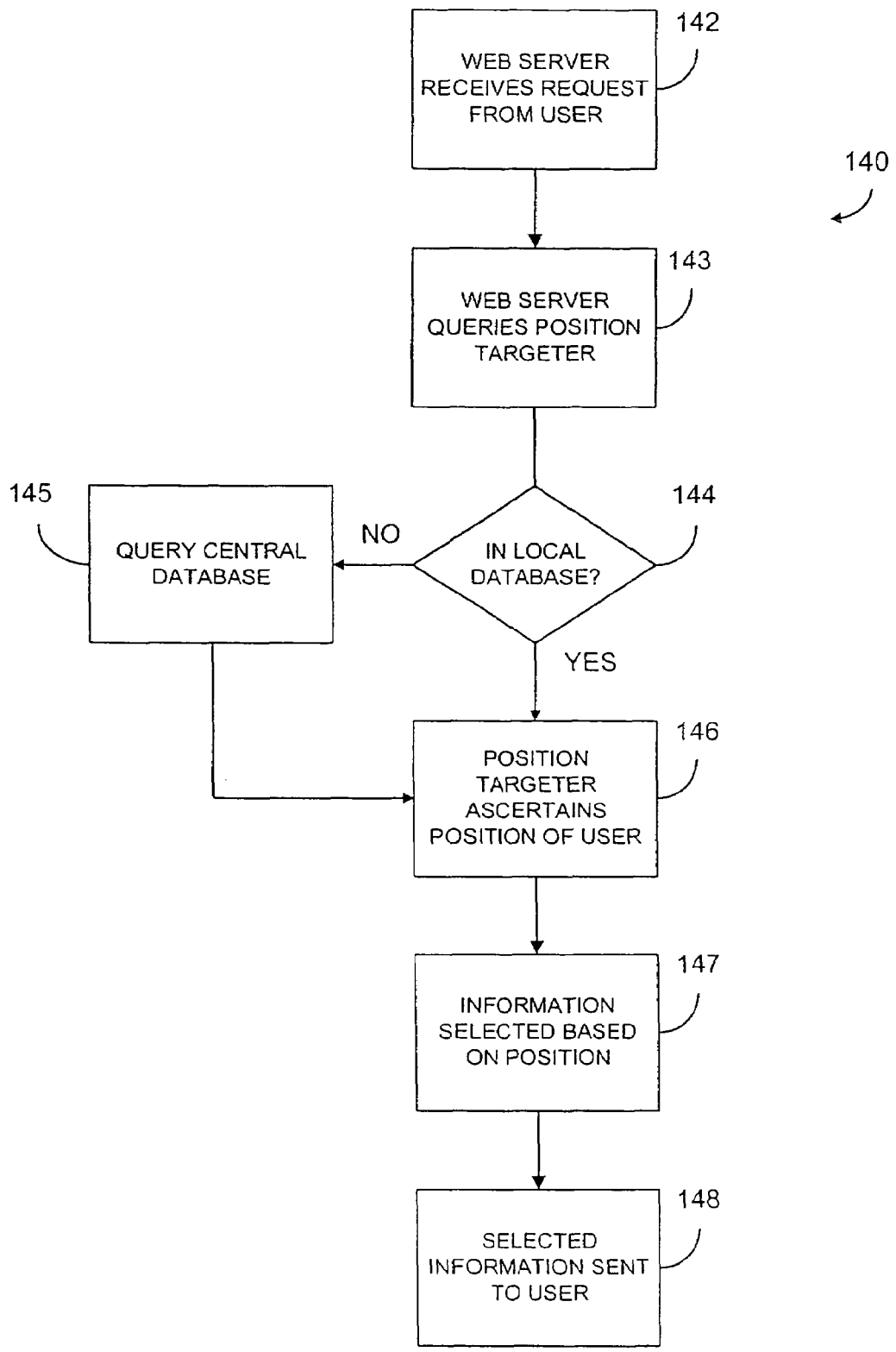
FIG. 9 is a flow chart depicting a preferred method of operation for the web server and position targeter of FIG. 8.

As another option shown in FIG. 8, the web site 60 may be associated with a local database 66 storing geographic information on users 5. With reference to FIG. 9, a preferred method 140 of operation begins at 142 with the web server 62 receiving a request from the user 5. At 143, the web server 62 queries a position targeter 64' for the geographic location information. Unlike the operation 130 of the position targeter 64 in FIGS. 6 and 7, the position targeter' next first checks the local database 66 for the desired geographic information. If the location information is not in the database 66, then at 145 the position targeter 64' queries the database 20 associated with the collection and determination system 50.

After the position targeter 64' obtains the geographic information at 146, either locally from database 66 or centrally through database 20, the desired information is selected based on the geographic location of the user 5. Again, as discussed above, this selection process may be performed by the position targeter 64' or by the web server 62. In either event, the selected information is delivered to the user 5 at 148.

For both the position targeter 64 and position targeter 64', the position targeter may be configured to output HTML code based on the result of the geographic location query. An HTML code based result is particularly useful when the web site 60 delivers dynamic web pages based on the user's 5 location. It should be understood, however, that the output of the position targeter 64 and position targeter 64' is not limited to HTML code but encompasses any type of content or output, such as JPEGs, GIFs, etc.

A sample search against the host "digitalenvoy.net" is shown here (items in bold are responses from the position targeter 64 or 64':
>distributionprogram digitalenvoy.net
vancouver;british columbia;can;99;

The format of the output, of course, may differ if different options are enabled or disabled.

End users 5 may elect a different geographic location as compared to where they have been identified from by the system 50 when it possibly chooses an incorrect geographic location. If this information is passed backed to the position targeter 64 or 64', the position targeter 64 or 64' will pass this information to the determination system 30 which will store this in the database 20 for later analysis. Because this information cannot be trusted completely, the collection and determination system 50 must analyze and verify the information and possibly elect human intervention.

E. Determining Geographic Locations Through A Proxy Server

Figure 10:
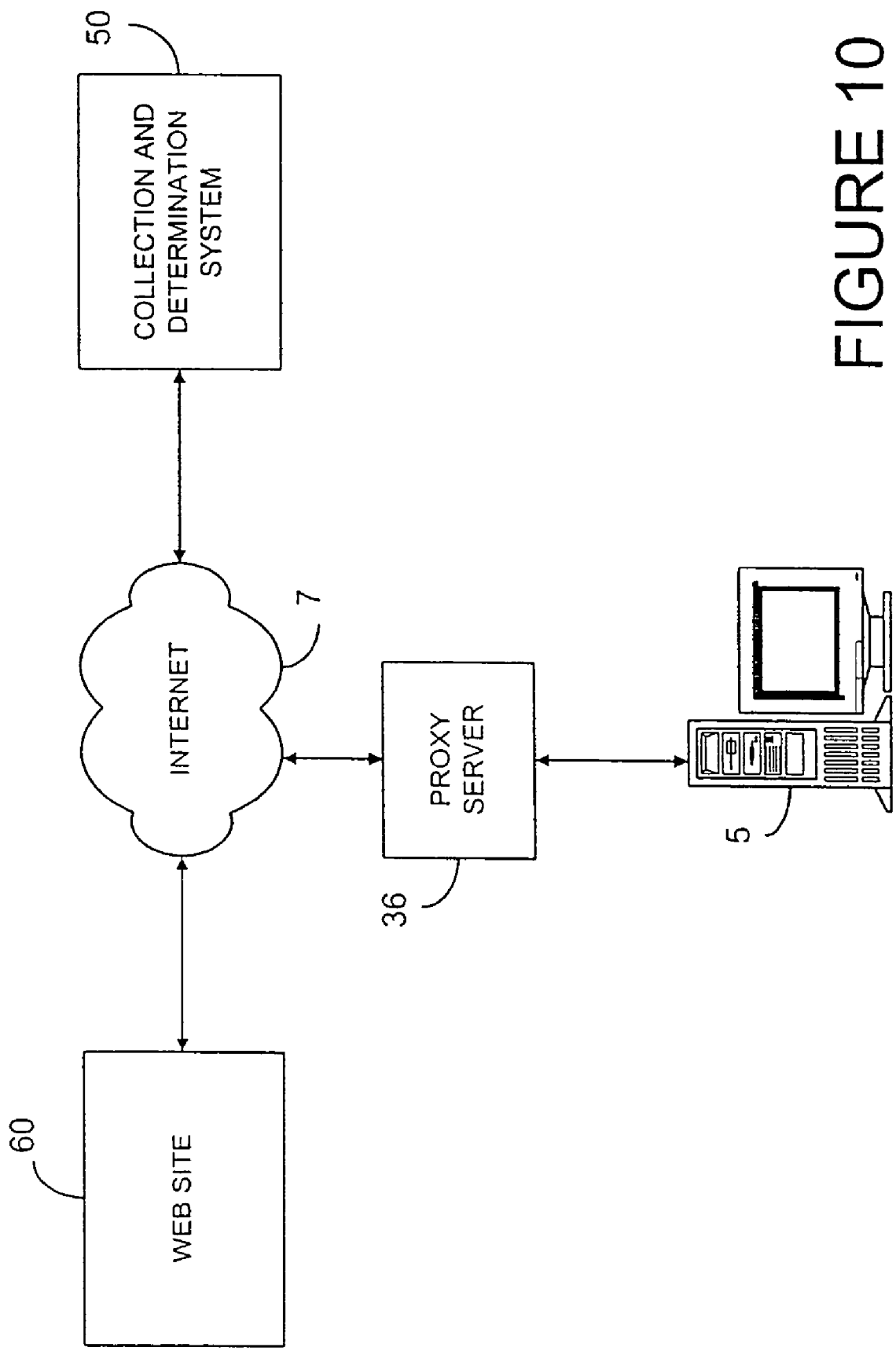
FIG. 10 is a block diagram of a network depicting the gathering of geographical location information from a user through a proxy server.

One difficulty in providing geographic information on a target host is when the target host is associated with a caching proxy server. A caching proxy will make requests on behalf of other network clients and save the results for future requests. This process reduces the amount of outgoing bandwidth from a network that is required and thus is a popular choice for many Internet access providers. For instance, as shown in FIG. 10, a user 5 may be associated with a proxy server 36.

In some cases, this caching is undesirable since the data inside them becomes stale. The web has corrected this problem by having a feature by which pages can be marked uncacheable. Unfortunately, the requests for these uncacheable pages still look as if they are coming from the proxy server 36 instead of the end-user computers 5. The geographic information of the user 5, however, may often be required.

A method 150 of determining the geographic information of the user 5 associated with the proxy server 36 will now be described with reference to FIG. 11. In the preferred embodiment, the user 5 has direct routable access to the network; e.g. a system using Network Address Translation will not work since the address is not a part of the global Internet. Also, the proxy server 36 should allow access through arbitrary ports whereby a corporate firewall which blocks direct access on all ports will not work. Finally, the user 5 must have a browser that supports Java Applets or equivalent such functionality.

Figure 6:
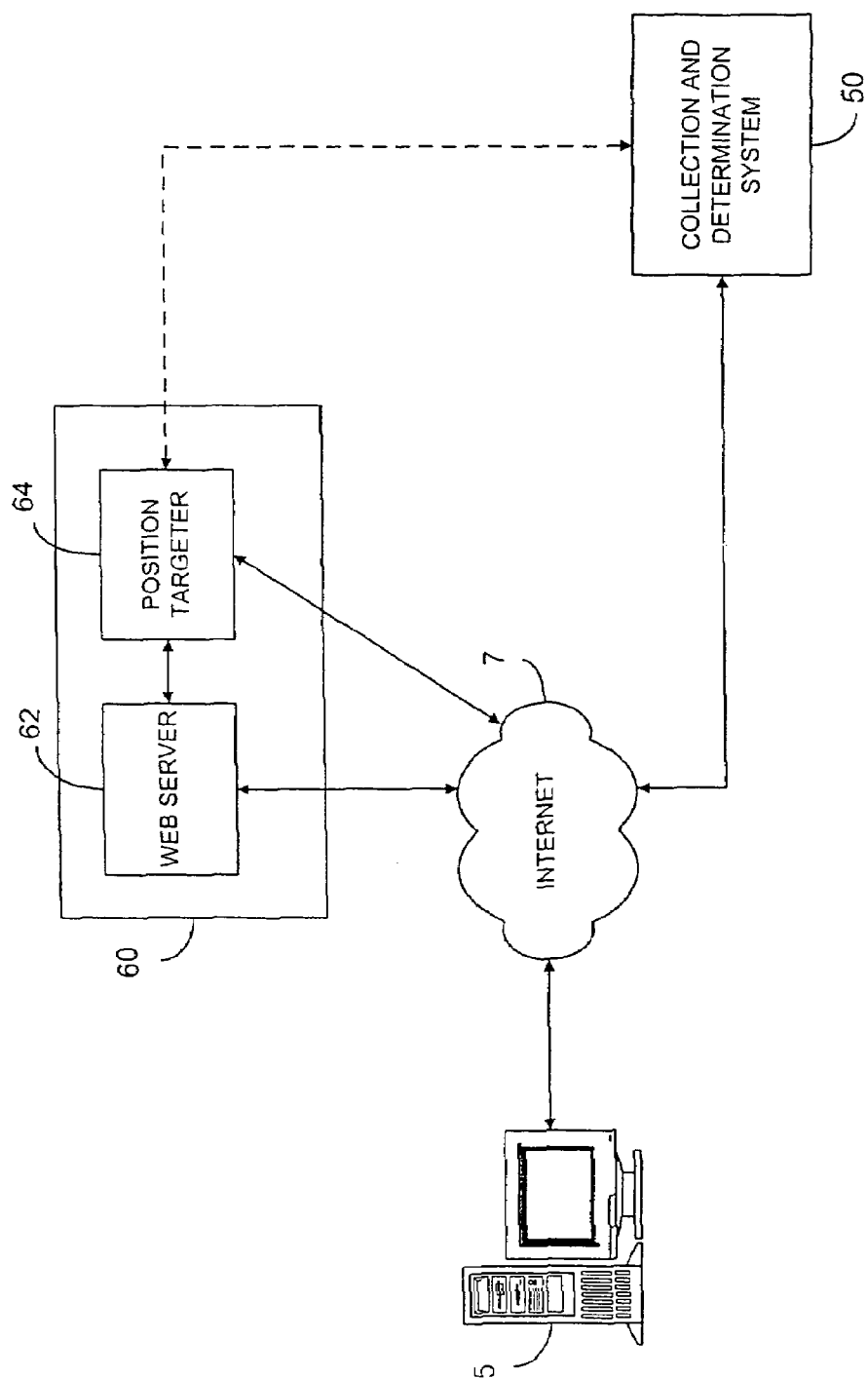
FIG. 6 is a block diagram of a web server using a position targeter connected to the collection and determination system.
Figure 11:
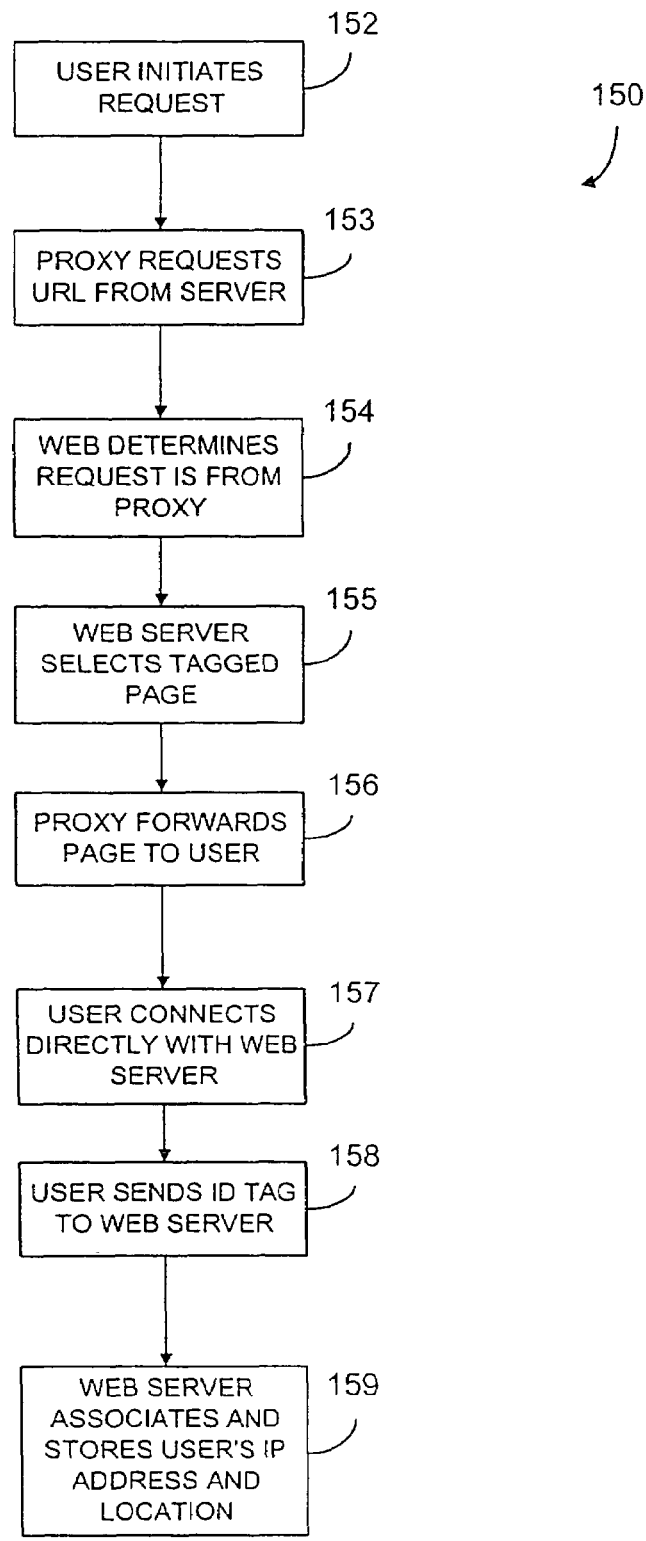
FIG. 11 is a flow chart depicting a preferred method of operation for gathering geographic information through the proxy server.

With reference to FIG. 11, at 152, a user 5 initiates a request to a web server 60, such as the web server 60 shown in FIG. 6 or FIG. 8. At 153, the HTTP request is processed by the proxy server 36 and no hit is found in the proxy's cache because the pages for this system are marked uncachable. On behalf of the user 5, the proxy server 38 connects to the web server 60 and requests the URL at 153. At 154, the web server 60 either through the local database 60 or through the database 20 with the collection and determination system 50, receives the request, determines it is coming from a proxy server 36, and then at 155 selects the web page that has been tagged to allow for the determination of the user's 5 IP address. The web page is preferably tagged with a Java applet that can be used to determine the IP address of the end-user 5. The web server 60 embeds a unique applet parameter tag for that request and sends the document back to the proxy server 36. The proxy server 36 then forwards the document to the user 5 at 156.

At. 157, the user's 5 browser then executes the Java Applet, passing along the unique parameter tag. Since by default applets have rights to access the host from which they came, the applet on the user's 5 browser opens a direct connection to the client web server 60, such as on, but not limited to, port 5000. The web server 60, such as through a separate server program, is listening for and accepts the connection on port 5000. At 158, the Java applet then sends back the unique parameter tag to the web server 60. Since the connection is direct, the web server 60 at 159 can determine the correct IP address for the user 5, so the web server 60 now can associate the session tag with that IP address on all future requests coming from the proxy server 38.

As an alternative, at 155, the web server 155 may still deliver a web page that has a Java applet. As with the embodiment discussed above, the web page having the Java applet is delivered to the proxy server at 156 and the user 5 connects with the web server 60 at 157. The Java applet according to this embodiment of the invention differs from the Java applet discussed above in that at 158 the Java applet reloads the user's browser with what it was told to load by the web server 60. The Java applet according to this aspect of the invention is not associated with a unique parameter tag that alleviates the need to handle and to sort the plurality of unique parameter tags. Instead, with this aspect of the invention, the web server 60 at 159 determines the IP address and geographic location of the user 5 when the Java applet connects to the web server 60.

II. Tailoring an Internet Site Based on Geographic Location of its Visitors

The web site 60 can tailor the Internet site based upon the geographic location or Internet connection speed of an Internet user 5. When the user 5 visits the Internet site 60, the Internet site 60 queries a database, such as local database 60 or central database 20, over the Internet which then returns the geographic location and/or Internet connection speed of the user based upon the user's IP address and other relevant information derived from the user's "hit" on the Internet site 60. This information may be derived from the route to the user's 5 machine, the user's 5 host name, the hosts along the route to the user's machine 5, via SNMP, and/or via NTP but not limited to these techniques. Based on this information the Internet site 60 may tailor the content and/or advertising presented to the user. This tailoring may also include, but not be limited to, changing the language of the Internet site to a user's native tongue based on the user's location, varying the products or advertising shown on an Internet site based upon the geographic information and other information received from the database, or preventing access based on the source of the request (i.e. "adult" content sites rejecting requests from schools, etc.). This tailoring can be done by having several alternative screens or sites for a user and having the web server 62 or position targeter 64 or 64' dynamically select the proper one based upon the user's geographic information. The geographic information can also be analyzed to effectively market the site to potential Internet site advertisers and external content providers or to provide media-rich content to users that have sufficient bandwidth.

The methods of tailoring involve tracing the path back to the Internet user's machine 5, determining the location of all hosts in the path, making a determination of the likelihood of the location of the Internet user's machine, determining other information about the hosts, which may or may not be linked to its geographic location, in the path to and including the Internet user's machine by directly querying them for such information (by using, but not limited by, SNMP or NTP for example), or alternatively, there is a complete database that may be updated that stores information about the IP addresses and host names which can be queried by a distant source which would then be sent information about the user.

The web site 60 dynamically changes Internet content and/or advertising based on the geographic location of the Internet user 5 as determined from the above methods or processes. The web site 60 presents one of several pre-designed alternative screens, presentations, or mirror sites depending on the information sent by the database as a result of the user 5 accessing the web site 60.

As discussed above, the selection of the appropriate information to deliver to the user 5 base on the geographic location can be performed either by the web server 62 or the position targeter 64 or 64'. In either case, the web site can dynamically adapt and tailor Internet content to suit the needs of Internet users 5 based on their geographic location and/or connection speed. As another option, the web site 60 can dynamically adapt and tailor Internet advertising for targeting specific Internet users based on their geographic location and/or connection speed. Furthermore, the web site 60 can dynamically adapt and tailor Internet content and/or advertising to the native language of Internet users 5 which may be determined by their geographic location. Also, the web site 60 can control access, by selectively allowing or disallowing access, to the Internet site 60 or a particular web page on the site 60 based on the geographic location, IP Address, host name and/or connection speed of the Internet user. As another example, the web site can analyze visits by Internet users 5 in order to compile a geographic and/or connection speed breakdown of Internet users 5 to aid in the marketing of Internet sites.

A. Credit Card Fraud

In addition to using geographic location information to target information to the user, the web site 60 or the collection and determination system 50 can provide a mechanism for web sites owners to detect possible cases on online credit card fraud. When a user 5 enters information to complete an on-line order, he/she must give a shipping and billing address. This information cannot currently be validated against the physical location of the user 5. Through the invention, the web site 60 determines the geographic location of the user 5. If the user 5 enters a location that he is determined not to be in, there could be a possible cause of fraud. This situation would require follow up by the web site owner to determine if the order request was legitimate or not.

B. Site Management

Figure 12:
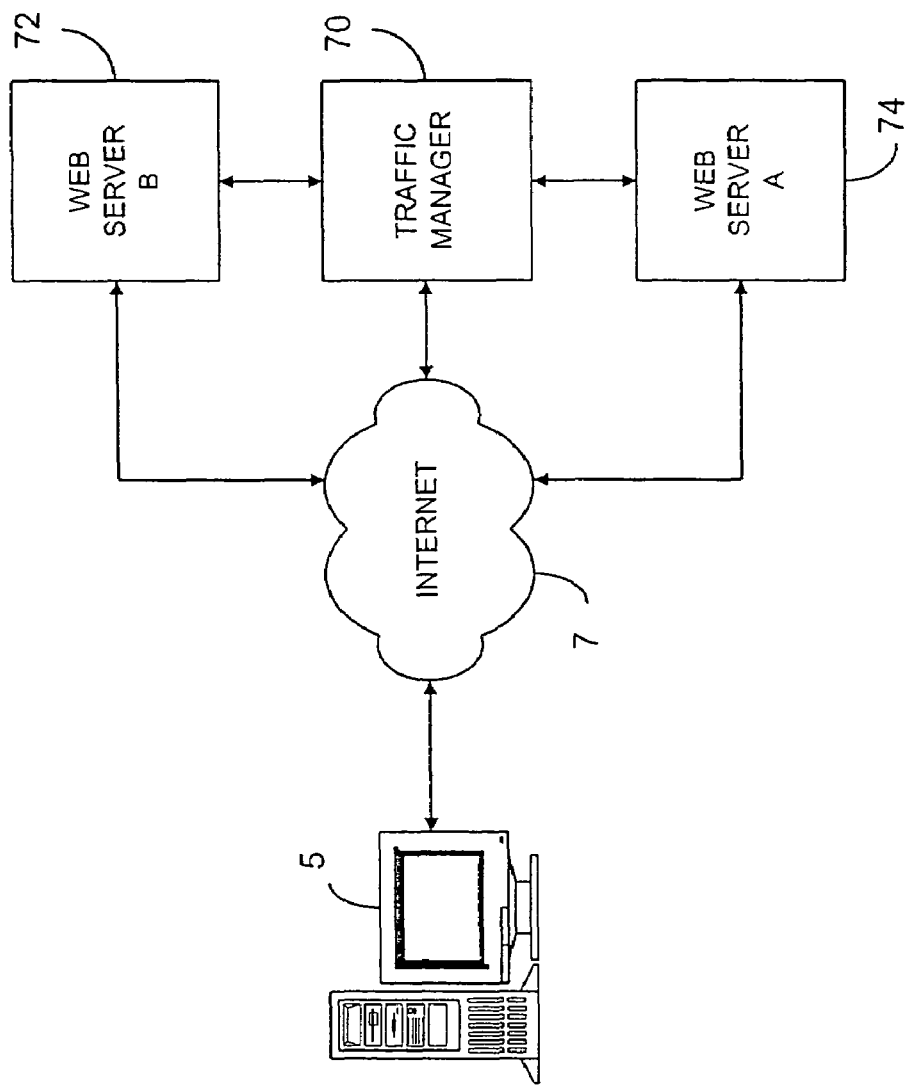
FIG. 12 is a block diagram of a traffic manager according to a preferred embodiment of the invention.

In addition to using geographic information to detect credit card fraud, the geographic information can also be used in managing traffic on the Internet 7. For example, with reference to FIG. 12, a traffic manager 70 has the benefit of obtaining the geographic information of its users or visitors 5.

The traffic manager 70 may employ the local database 60 or, although not shown, may be connected to the collection and determination system 50. After the traffic manager 70 detects the geographic location of the users 5, the traffic manager 70 directs a user's 5 request to the most desirable web server, such as web server A 74 or web server B 72. For instance, if the user 5 is in Atlanta, the traffic manager 70 may direct the user's request to web server A 74 which is based in Atlanta. On the other hand, if the user 5 is in San Francisco, then the traffic manager 70 would direct the user 5 to web server B, which is located in San Francisco. In this manner, the traffic manager 70 can reduce traffic between intermediate hosts and direct the traffic to the closest web server.

III. Profile Server and Profile Discovery Server

Figure 13:
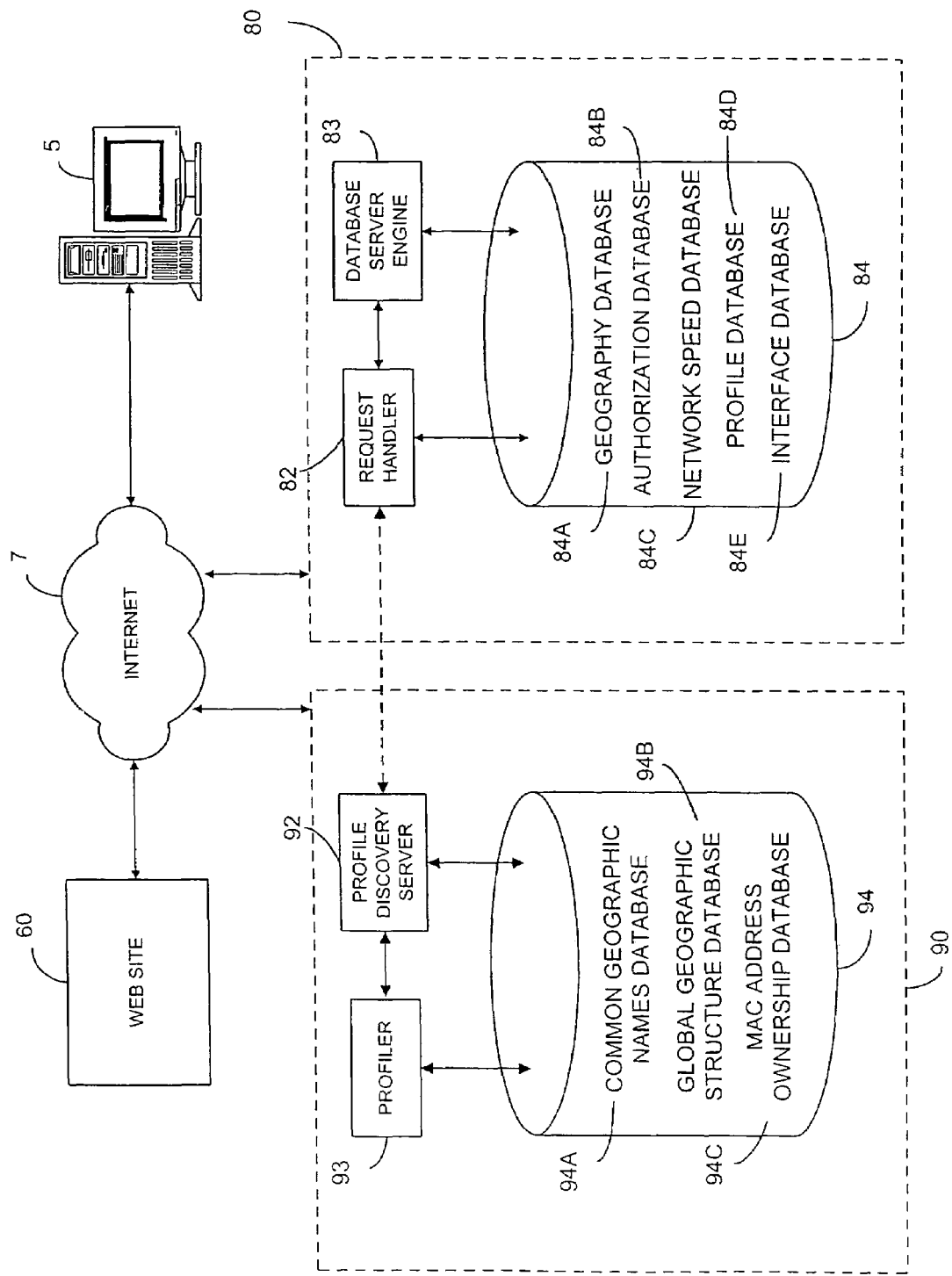
FIG. 13 is a block diagram of a network including a profile server and a profile discovery server according to a preferred embodiment of the invention.

As discussed above, the collection and determination system 50 may store geographic information on users 5 and provide this information to web sites 60 or other requesters 40. According to another aspect of the invention, based on the requests from the web sites 60 and other requestors 40, information other than the geographic location of the users 5 is tracked. With reference to FIG. 13, a profile server 80 is connected to the web site 60 through the Internet and also to a profile discovery server 90, which may also be through the Internet, through another network connection, or a direct connection. The profile server 80 comprises a request handler 82, a database server engine 83, and a database 84. As will be more apparent from the description below, the database 84 includes a geography database 84A, an authorization database 84B, a network speed database 84C, a profile database 84D, and an interface database 84E. The profile discovery server 90 includes a discoverer engine 92, a profiler 93, and a database 94. The database 94 includes a common geographic names database 94A, a global geographic structure database 94B, and a MAC address ownership database 94C.

A. Profiler

In general, the profile server 80 and profile discovery server 90 gather information about specific IP addresses based upon the Internet users' interactions with the various web sites 60 and other requestors 40. This information includes, but is not limited to, the types of web sites 60 visited, pages hit such as sports sites, auction sites, news sites, e-commerce sites, geographic information, bandwidth information, and time spent at the web site 60. All of this information is fed from the web site 60 in the network back to the database 84. This information is stored in the high performance database 84 by IP address and creates an elaborate profile of the IP address based on sites 60 visited and actions taken within each site 60. This profile is stored as a series of preferences for or against predetermined categories. No interaction is necessarily required between the web site 60 and the user's 5 browser to maintain the profile. Significantly, this method of profiling does not require the use of any cookies that have been found to be highly objectionable by the users. While cookies are not preferred, due to difficulties induced by network topology, cookies may be used to track certain users 5 after carefully considering the privacy issues of the users 5.

As users 5 access web sites 60 in the network, profiled information about the IP address of the user 60 is sent from the database 84 to the position targeter 64 or 64' at the web site 60. As explained above, the position targeter 64 or 64' or the web server 62 allows pre-set configurations or pages on the web site 60 to then be dynamically shown to the user 5 based on the detailed profile of that user 5. In addition preferences of users 5 similar to those of a current user 5 can be used to predict the content that the current user 5 may prefer to view.

The information profiled could include, but is not limited to, the following: geographic location, connection speed to the Internet, tendency to like/dislike any of news, weather, sports, entertainment, sporting goods, clothing goods, etc.

As an example, two users are named Alice and Bob. Alice visits a web site, www.somerandomsite.com. This site, asks the profile server 80, such as server.digitalenvoy.net, where Alice is from and what she likes/dislikes. The database 84 has no record of Alice but does know from geography database 84A that she is from Atlanta, Ga. and notifies the web site to that effect. Using Alice's geographic information, the web site sends Alice a web page that is tailored for her geographic location, for instance it contains the Atlanta weather forecast and the new headlines for Atlanta. Alice continues to visit the web site and buys an umbrella from the site and then terminates her visit. The web site lets the profile server 80 and database 84 know that Alice bought an umbrella from the site. Bob then visits the site www.somerandomsite.com. The site again asks the profile server 80, such as a server.digitalenvoy-.net, about Bob. The server 80 looks in the database 84 for information on Bob and finds none. Again though, the server 80 looks in the geography database 84A and determines that he is from Atlanta, Ga. Also, based on the data gathered in part from Alice and stored in profile database 84D, the profile server 80 infers that people from Atlanta, Ga. may like to buy umbrellas. The site uses Bob's geographic information and the fact that Atlantans have a propensity to buy umbrellas to send Bob a web page with Atlanta information, such as the weather and news, and an offer to buy an umbrella. Bob buys the umbrella and the site sends this information to the server 80, thereby showing a greater propensity for Atlantan's to buy umbrellas.

In addition, if the profile stored in the profile database 84D in profile server 80 shows that an IP Address has previously hit several e-commerce sites and sports sites in the network and that the address is located in California, the web site can be dynamically tailored to show sports items for sale that are more often purchased by Californians, such as surf boards. This method allows for more customized experiences for users at e-commerce and information sites.

This information can also be compiled for web sites in the network or outside the network. Web sites outside of the network can develop profiles of the users typically hitting their web site. Log files of web sites can be examined and IP Addresses can be compared against the profiled IP Address information stored on the central server. This will allow web sites to analyze their traffic and determine the general profile of users hitting the site.

In order to remove "stale" information, the database server engine 83 occasionally purges the database 84 in the profile server 80. For example, a user 5 that is interested in researching information about a trip will probably not want to continue seeing promotions for that trip after the trip has been completed. By purging the database 84, old preferences are removed and are updated with current interests and desires.

B. Content Registry

In addition to the examples provided above, the profile server 80 can provide a mechanism for end users 5 to register their need for certain types of information content to be allowed or disallowed from being served to their systems. Registration is based on IP address and registration rights are limited to authorized and registered owners of the IP addresses. These owners access the profile server 80 through the Internet and identify classes of Internet content that they would want to allow or disallow from being served to their IP addresses ranges. The classes of Internet content that a particular IP address or block of addresses are allowed or disallowed from receiving is stored by the profile server 80 in the authorization database 84B. Internet content providers, such as web sites 60, query the profile server 80, which in turn queries the authorization database 84B, and identify users 5 that do or do not want to receive their content based on this IP address registry.

For example, a school registers their IP ranges and registers with the profile server 80 to disallow adult content from being sent to their systems. When an access is made from machines within the school's IP range to an adult site, the adult site checks with the profile server 80 and discovers that content provided by the adult site is disallowed from being sent to those IP addresses. Instead of the adult content, the adult site sends a notice to the user that the content within the site cannot be served to his/her machine. This series of events allows end IP address owners to control the content that will be distributed and served to machines within their control.

C. Bandwidth Registry

The profile server 80 preferably is also relied upon in determining the amount of content to be sent to the user 5. Web sites 60 dynamically determine the available bandwidth to a specific user and provide this information to the profile server 80, which stores this information in the network speed database 84C. In addition, the web site 60 examines the rate and speed by which a specific user 5 is able to download packets from the web site 60, the web site 60 determines the available bandwidth from the web site 60 to the end user 5. If there is congestion at the web site 60, on the path to the end user 5, or at the last link to the user's 5 terminal, the web site 60 limits the available bandwidth for that user 5. Based on this information, the web site 60 can dynamically reduce the amount of information being sent to the user 60 and consequently increase download times perceived by the user 5. The bandwidth information is preferably sent to the profile server 80 and stored in the network speed database 84C so that other sites 60 in the network have the benefit of this bandwidth information without having to necessarily measure the bandwidth themselves.

In order to remove "stale" bandwidth information, the database server engine 83 occasionally purges the information in the network speed database 84C. For example, congestion between a web site 60 and a user 5 will usually not persist.

D. Interface Registry

Web sites 60 also preferably are able to dynamically determine the interface that a user 5 has to view the web site 60. This user interface information may be placed in the database 84E through a registration process, may be known from the ISP, or may be detected or discovered in other ways. Personal Digital Assistant (PDA) users are shown a web site 60 with limited or no graphics in order to accommodate the PDAs limited storage capabilities. Web sites 60 query the profile server 80 when accessed by a user 5. The profile server 80, in turn, queries the interface database 84E and, if available, retrieves the type of interface associated with a particular IP address. The profile server 80 stores in the database 84E all users and informs the web site 60 of the display interface that the user 5 has. Based on this information, the web site 60 tailors the information that is being sent to the user 5.

E. Methods of Operation

Figure 14A:
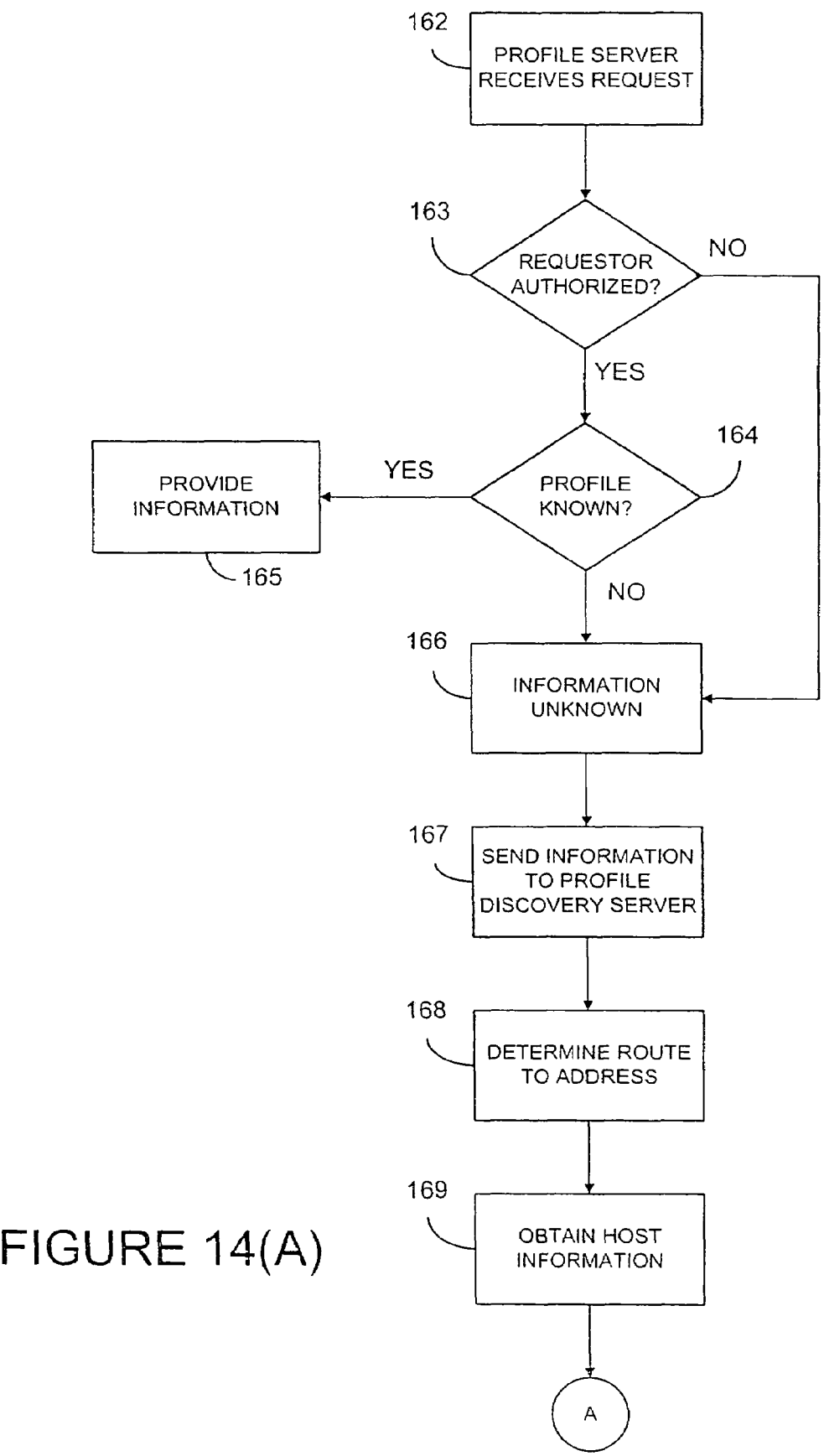
FIGS. 14(A) and 14(B) are flow charts depicting preferred methods of operation for the profile server and profile discovery server of FIG. 13.
Figure 14B:
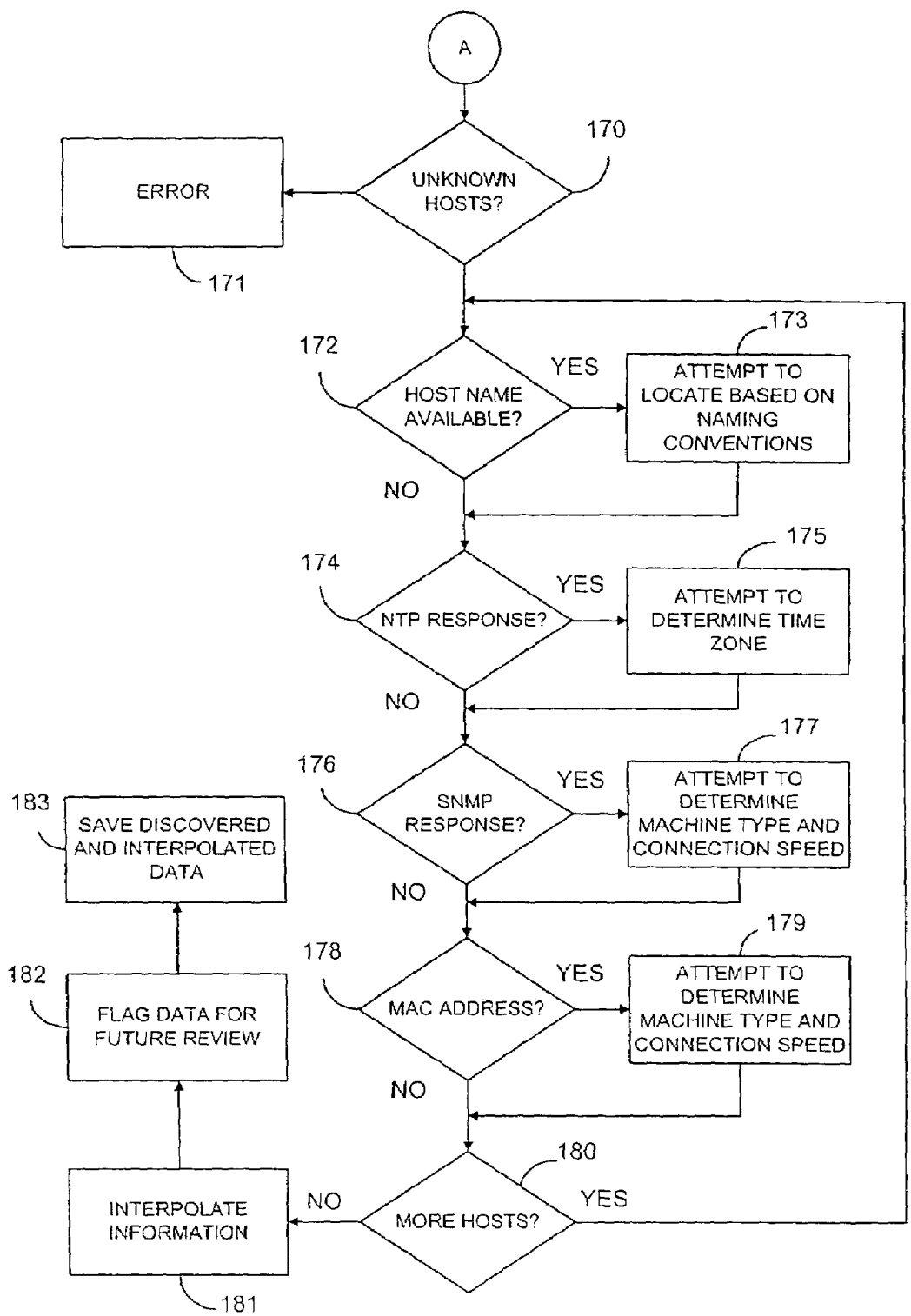

A preferred method 160 of operation for the profile server 80 and profile discovery server 90 will now be described with reference to FIGS. 14(A) and 14(B). At 162, the profile server 80 is given an IP address or host name to query. At 163, the profile server 80 determines whether the requester is authorized to receive the information and, if not, tells the requestor at 166 that the information is unknown. The inquiry as to whether the requestor is authorized at 163 is preferably performed so that only those entities that have paid for access to the profile server 80 and profile discovery server 90 obtain the data. If the requester is authorized, then the profile server at 164 determines whether the profile of the address is known. If the profile for that address is known, the profile server 80 sends the requested information to the requester at 165, otherwise the profile server 80 at 166 informs the requestor that the information is unknown.

For information that is unknown to the profile server 80, the profile server 80 passes the information to the profile discovery server 90 at 167. At 168, the profile discovery server determines the route to the address, at 169 obtains known information about all hosts in route from the profile server 80, and then decides at 170 whether any unknown hosts are left in the route. If no unknown hosts are left in the route, then at 171 the profile discovery server 90 returns an error condition and notifies the operator.

For each host name left in the route, the profile discovery server 90 next at 172 determines whether a host name exists for the unknown host. If so, then at 173 the profile discovery server attempts to determine the location based on common host name naming conventions and/or global country based naming conventions. At 174, the profile discovery server 90 checks whether the host responds to NTP queries and, if so, at 175 attempts to determine the time zone based on the NTP responses. At 176, the profile discovery server 90 checks whether the host responds to SNMP queries and, if so, at 177 attempts to determine the location, machine type, and connection speed based on public SNMP responses. Next, at 178, the profile discovery server 90 checks whether the host has a MAC address and, if so, attempts to determine machine type and connection speed based on known MAC address delegations.

At 180, the profile discovery server 90 determines whether any additional unknown hosts exist. If so, the profile discovery server 90 returns to 172 and checks whether a host name is available. When no more unknown hosts exist, the profile discovery server 90 at 181 interpolates information to determine any remaining information, at 182 flags the interpolated data for future review, and at 183 saves all discovered and interpolated data at the profile server 80.

The foregoing description of the preferred embodiments of the invention has been presented only for the purpose of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated.

What is claimed:

1. A method of determining a geographic location of an Internet user who connects to the Internet through a proxy server, comprising:
    a. sending an applet and a unique applet parameter tag to the Internet user through the proxy server;
    b. receiving from the applet an IP address associated with the Internet user and the unique applet parameter tag;
    c. associating the unique applet parameter tag with the IP address for requests coming through the proxy server;
    d. obtaining a route through the Internet to a target host for the IP address, the route comprising a plurality of intermediate hosts;
    e. determining a geographic naming information for each of the plurality of intermediate hosts in the route;

f. determining a geographic location for each of the plurality of intermediate hosts in the route by matching the plurality of intermediate hosts in the route to geographic locations through use of a database correlating geographic naming information to geographic locations;

g. assigning a confidence level to the determined geographic location of each of the plurality of intermediate hosts in the route;

h. determining the geographic location of the Internet user using the route, the geographic location of one or more of the plurality of intermediate hosts, and the confidence level assigned to one or more of the plurality of intermediate hosts in the route;

i. assigning a confidence level to the determined geographic location of the Internet user using the confidence level assigned to at least one intermediate host from the plurality of intermediate hosts in the route; and j. storing in a database the geographic location of the Internet user, the confidence level assigned to each of the plurality of intermediate hosts, and the confidence level assigned to the determined geographic location of the Internet user.

2. The method of claim 1, further comprising communicating to the Internet user the determined geographic location of the Internet user and the confidence level assigned to the determined geographic location of the Internet user.

3. The method of claim 1, wherein determining the geographic location of the Internet user using the route, the geographic location of one or more of the plurality of intermediate hosts, and the confidence level assigned to one or more of the plurality of intermediate hosts in the route comprises determining the geographic location of the Internet user comprising a city of the Internet user using the route, the geographic location of one or more of the plurality of intermediate hosts, and the confidence level assigned to one or more of the plurality of intermediate hosts in the route.

* * * * *